(12) United States Patent
Takano

(10) Patent No.: US 10,136,154 B2
(45) Date of Patent: Nov. 20, 2018

(54) VIDEO CODING APPARATUS, VIDEO CODING METHOD, AND NON-TRANSITORY COMPUTER READABLE MEDIUM

(71) Applicant: NEC Corporation, Minato-ku, Tokyo (JP)

(72) Inventor: Fumiyo Takano, Tokyo (JP)

(73) Assignee: NEC CORPORATION, Tokyo (JP)

(*) Notice: Subject to any disclaimer, the term of this patent is extended or adjusted under 35 U.S.C. 154(b) by 152 days.

(21) Appl. No.: 15/038,626

(22) PCT Filed: May 26, 2014

(86) PCT No.: PCT/JP2014/002745
§ 371 (c)(1),
(2) Date: May 23, 2016

(87) PCT Pub. No.: WO2015/083300
PCT Pub. Date: Jun. 11, 2015

(65) Prior Publication Data
US 2016/0295225 A1 Oct. 6, 2016

(30) Foreign Application Priority Data

Dec. 4, 2013 (JP) .................................. 2013-250926

(51) Int. Cl.
*H04N 7/12* (2006.01)
*H04N 11/02* (2006.01)
(Continued)

(52) U.S. Cl.
CPC ......... *H04N 19/513* (2014.11); *H04N 19/119* (2014.11); *H04N 19/43* (2014.11);
(Continued)

(58) Field of Classification Search
CPC .......................... H04N 19/137; H04N 19/139
(Continued)

(56) References Cited

U.S. PATENT DOCUMENTS 6,424,676 B1 7/2002 Kounou et al.
2008/0126278 A1* 5/2008 Bronstein ............ H04N 19/176
706/17

(Continued)

FOREIGN PATENT DOCUMENTS

JP H07-177519 A 7/1995
JP 2000-050281 A 2/2000
(Continued)

OTHER PUBLICATIONS

"High efficiency video coding", Series H: Audiovisual and Multimedia Systems, Infrastructure of audiovisual services—Coding of moving video, ITU-T, Recommendation ITU-T H.265, Apr. 2013 English Abstract.
(Continued)

Primary Examiner — Chikaodili E Anyikire

(57) ABSTRACT

A motion estimator that divides an image into a plurality of blocks and estimates motion information including a motion vector of each block includes: independent processing units, a dependent processing unit, and a motion vector buffer. The independent processing units can operate in parallel, search for a motion vector of each block using a reference image and a current image without using motion information on neighboring blocks, and record the motion vector in the motion vector buffer. The dependent processing unit determines whether or not to change motion information on a processing target block by referring to motion information on neighboring blocks held in the motion vector buffer, and when it is determined that it is necessary to change the motion information, the dependent processing unit performs processing for recording the changed motion information in the motion information buffer and outputting the changed motion information to outside.

8 Claims, 20 Drawing Sheets

(51) Int. Cl.
*H04N 11/04* (2006.01)
*H04N 19/513* (2014.01)
*H04N 19/43* (2014.01)
*H04N 19/436* (2014.01)
*H04N 19/119* (2014.01)
*H04N 19/52* (2014.01)
*H04N 19/597* (2014.01)

(52) U.S. Cl.
CPC ........... *H04N 19/436* (2014.11); *H04N 19/52* (2014.11); *H04N 19/597* (2014.11)

(58) Field of Classification Search
USPC .................................................... 375/240.16
See application file for complete search history.

(56) References Cited

U.S. PATENT DOCUMENTS

2009/0225845 A1* 9/2009 Veremeev .............. H04N 5/145
375/240.16
2012/0257678 A1* 10/2012 Zhou ...................... H04N 19/52
375/240.16
2013/0272421 A1* 10/2013 Takano .................. H04N 19/61
375/240.16

FOREIGN PATENT DOCUMENTS

| JP | 2012-175424 A | 9/2012 |
| JP | 2013-121167 A | 6/2013 |
| WO | 2012/086829 A1 | 6/2012 |

OTHER PUBLICATIONS

Cheung, Nagai-Man et al."Video codign on multicore graphics processors", IEEE Signal Processing Magazine, vol. 27, No. 2, Mar. 2010, IEEE27.2, pp. 79-89 English Abstract.

International Search Report for PCT Application No. PCT/2014/002745 dated Aug. 12, 2014.

* cited by examiner

VIDEO CODING APPARATUS, VIDEO CODING METHOD, AND NON-TRANSITORY COMPUTER READABLE MEDIUM

This application is a National Stage Entry of PCT/JP2014/002745 filed on May 26, 2014, which claims priority from Japanese Patent Application 2013-250926 filed on Dec. 4, 2013, the contents of all of which are incorporated herein by reference, in their entirety.

TECHNICAL FIELD

The present invention relates to a video coding apparatus, a video coding method, and a video coding program. In particular, the present invention relates to a video coding apparatus, a video coding method, and a video coding program which operate with a high efficiency in parallel processing, without deteriorating a coding efficiency.

BACKGROUND ART

In recent years, the demand for improving the resolution of videos has been increasing. Along with the increasing demand, coding techniques for improving the compression efficiency, such as an MPEG (Moving Picture Experts Group)-2, H.264/MPEG-4 AVC (hereinafter abbreviated as H.264), H.265/HEVC (High Efficiency Video Coding) (hereinafter abbreviated as H.265), have been developed. These coding systems have achieved a high coding efficiency by compressing information using inter-frame motion compensation prediction. FIG. 19 shows an example of a video coding apparatus based on the H.265 specification.

As shown in FIG. 19, the video coding apparatus based on the H.265 specification generally includes a motion compensation predictor 001, an orthogonal transformer 002, a quantizer 003, an encoder (an entropy coder) 004, an inverse quantizer 005, an inverse orthogonal transformer 006, an intra frame predictor 007, a motion estimator 008, a loop filter 009, and a frame buffer 010. ITU-T (International Telecommunication Union Telecommunication Standardization Sector) Recommendation H.265 "High efficiency video coding" in Non Patent Literature 1 discloses the details of processing contents based on the H.265 specification. Accordingly, the detailed description of the constituent elements thereof will be omitted.

Video coding processing based on the H.265 specification is performed on each block of 64×64 pixels at maximum which is called a CTB (Coding Tree Brock)). The motion compensation prediction defined in the H.265 specification is a technique as described below. An image of a reference frame is corrected in the motion compensation predictor 001 by using motion information between a coding target frame, which is input as an input image, and a coded reference frame stored in the frame buffer 010. Video information is compressed by coding only the information representing the motion between the frames as difference information between a corrected image (predicted image) and a current image to be coded.

A motion between frames is represented by a motion vector indicating the amount of movement. The processing for calculating the motion information between the reference frame and the coding target frame in the motion estimator 008 is referred to as motion estimation. In the motion estimation processing, it is important to calculate the motion information capable of minimizing the amount of information to be coded, while preventing an increase in the amount of noise generated in a decoded image. Accordingly, in the recent video coding apparatus, a technique called RD (Rate-Distortion) optimization has been widely used.

In the RD optimization technique, a rate-distortion cost which is expressed as $J=D+\lambda R$ is calculated for a large number of motion vector candidates, and a motion vector having a minimum rate-distortion cost is adopted as the motion vector. In this case, D represents the amount of distortion generated in a difference image; R represents the amount of code generated in the coding of motion information; and $\lambda$ represents a weighting factor dependent on, for example, the complexity of an image. The motion information includes a difference between prediction vector information, which is described later, and a motion vector for the prediction vector information, and merge information.

Spatially or temporally neighboring blocks have a high correlation with motion information. Accordingly, in the H.265 specification, a code amount R which is necessary for motion information can be reduced by using AMVP (Adaptive Motion Vector Prediction) for adaptively selecting a predicted value (prediction vector) for a motion vector from among neighboring motion vectors, or a merge mode in which motion information is copied from neighboring blocks. Specific examples of "neighboring blocks" include spatially neighboring blocks (A0, A1, B0, B1, and B2) of a coding target block as shown in FIG. 20, and corresponding blocks in temporally neighboring frames. Blocks used for the merge mode or AMVP can be arbitrarily selected by the encoder from the list of neighboring blocks. FIG. 20 is a schematic diagram for explaining spatially neighboring blocks of the coding target block.

Since the CTB of the neighboring block A0 located in the lower left of FIG. 20 represents processing subsequent to the coding target CTB, the motion information on the neighboring block A0, i.e., the processing result, is referred to only during the coding of a sub-block in the CTB. To simplify the following description, the left neighboring block A1, the upper left neighboring block B2, the upper neighboring block B1, and the upper right neighboring block B0 are referenced as blocks to be subjected to coding processing.

In this case, the motion information on the neighboring blocks is the same as the information obtained in the decoder. Accordingly, the motion information can be transmitted by coding only the index of the neighboring block list, and thus the code amount R can be reduced. In the case of using the merge mode, the motion information includes a flag indicating the merge mode, and the index of a reference block. In cases other than the merge mode, the motion information includes the index of a block to be referenced by a prediction vector, and information on a difference between the prediction vector and a motion vector.

FIG. 21 shows a configuration example of the motion estimator 008 of the video coding apparatus shown in FIG. 19. The motion estimator 008 shown in FIG. 21 includes a motion vector search unit 020, an AMVP selection unit 021, a merge cost calculation unit 022, and a motion information determination unit 023. The motion vector search unit 020 performs block matching for a large number of motion vector candidates, and determines a provisional motion vector having a minimum cost. The AMVP selection unit 021 selects a prediction vector from the motion vectors of neighboring blocks so that the motion vector code amount R is minimized. The merge cost calculation unit 022 calculates a rate-distortion cost J of the merge mode using the motion information on the neighboring blocks. The motion information determination unit 023 determines whether or not to use the merge mode as final motion information.

In the case of using the merge mode, a merge vector obtained by copying the motion vectors of the neighboring blocks is used as the motion vector of the coding target block. In cases other than the merge mode, a provisional motion vector obtained as a result of motion search is used as the motion vector. The motion information determined in a certain block to be subjected to coding processing is used for AMVP selection and merge cost calculation for other blocks. The AMVP and the merge mode have an effect of greatly reducing the code amount. In order to obtain a high coding efficiency, it is important to appropriately use the AMVP and the merge mode.

The motion estimation processing for comparing the costs of a large number of vectors requires an extremely large amount of operation, and thus needs to be performed at a high speed. To achieve high-speed processing, parallel processing using a many-core processor, such as a GPU (Graphic Processing Unit), which includes a large number of processor cores, is especially promising.

An example of related parallel processing techniques is WPP (Wavefront Parallel Processing). A specific example of the WPP parallel processing is disclosed in "Video coding on multicore graphics processors" by Cheung et al. in Non Patent Literature 2. In the WPP parallel processing, as shown in FIG. 22, the blocks in the respective lines of the coding target frame that are each located at a position shifted leftward by two blocks from the block in the upper line are processed in parallel as coding target blocks. Thus, the processing results of the left neighboring block, the upper neighboring block, and the upper right neighboring block can be referenced. FIG. 22 shows a schematic diagram for explaining a specific example of the WPP parallel processing disclosed in Non Patent Literature 2.

Japanese Unexamined Patent Application Publication No. 2012-175424 "Coding Processing Apparatus and Coding Processing Method" in Patent Literature 1 discloses a technique in which an image is divided into a plurality of regions, and the regions in blocks adjacent to the boundary between the divided regions are processed in parallel using only the information on the blocks within the regions to which the blocks belong.

CITATION LIST

Patent Literature

[Patent Literature 1] Japanese Unexamined Patent Application Publication No. 2012-175424 (pp. 9-14)

Non Patent Literature

[Non Patent Literature 1] ITU-T Recommendation H.265 "High efficiency video coding", April 2013.
[Non Patent Literature 2] Cheung, Nagai-Man, et al. "Video coding on multicore graphics processors", Signal Processing Magazine, IEEE 27.2 (2010): 79-89.

SUMMARY OF INVENTION

Technical Problem

In the parallel processing during video coding, it is important that a large number of tasks can be processed in parallel so as to allow each of a plurality of processor cores to fully operate. The term "task" described herein refers to processing for each block when parallel processing such as WPP is performed, and also refers to processing for each divided region in the technique disclosed in Patent Literature 1. In order to allow a plurality of processor cores to operate, a number of tasks corresponding to at least the number of processor cores are required. In a case where the tasks have different amounts of processing, the more tasks there are, the easier it is to equally allocate the amount of processing to the processing cores. Accordingly, in the case of performing parallel processing by a many-core processor, such as a GPU, which includes several thousand processor cores, it is necessary that an extremely large number of tasks can be processed in parallel.

Meanwhile, in the motion estimation processing, as described above, the motion information is compressed using the spatial correlation and there is a spatial data dependency between the blocks. Therefore, the motion estimation processing has a problem that it is difficult to process a large number of blocks, i.e., a large number of tasks, in parallel. In the case of WPP parallel processing, a number of tasks corresponding to the number of block lines (34 in the case of 4 K resolution) can be processed in parallel at maximum. Further, in the case of the technique disclosed in Patent Literature 1, if an image is divided into a large number of regions (tasks), the number of blocks which cannot reference the blocks located outside the regions, i.e., the number of blocks to which the merge mode and AMVP cannot be applied increases, which causes a problem of deterioration in coding efficiency.

Object of the Present Invention

An object of the present invention is to provide a video coding apparatus, a video coding method, and a video coding program which solve the above-mentioned problems and are capable of processing a large number of tasks in parallel without deteriorating a coding efficiency.

Solution to Problem

In order to solve the above-mentioned problems, a video coding apparatus, a video coding method, and a video coding program according to the present invention mainly employ the following characteristic configurations.

(1) A video coding apparatus according to an exemplary aspect of the present invention is a video coding apparatus including: motion estimation processing means for dividing an image into a plurality of blocks and estimating motion information including a motion vector for each of the divided blocks. The motion estimation processing means includes: independent processing means for performing processing for each block without using motion information on neighboring blocks; dependent processing means for performing processing for each block using motion information on neighboring blocks; and a motion information buffer that holds motion information as a result of processing performed for each block. The independent processing means includes motion vector search means that is configured to be able to process all blocks in parallel every arbitrarily-set number of blocks, searches for a motion vector of each block using a reference image and a current image as an input, and records the motion vector in the motion information buffer. The dependent processing means determines whether or not to change motion information on a processing target block by referring to motion information on neighboring blocks held in the motion information buffer, and when it is determined that it is necessary to change the motion information, the dependent processing means performs an operation to record the changed motion information in the motion information buffer and output the changed motion information to outside.

(2) A video coding method according to an exemplary aspect of the present invention is a video coding method including a motion estimation processing step of dividing an image into a plurality of blocks and estimating motion information including a motion vector for each of the divided blocks. The motion estimation processing step includes: an independent processing step of performing processing for each block without using motion information on neighboring blocks; a dependent processing step of performing processing for each block using motion information on neighboring blocks; and a motion information buffering step of holding motion information as a result of processing performed for each block. The independent processing step includes a motion vector search step that is configured to be able to process all blocks in parallel every arbitrarily-set number of blocks, searches for a motion vector of each block using a reference image and a current image as an input, and holds the motion vector by the motion information buffering step.

The dependent processing step includes: determining whether or not to change motion information on a processing target block by referring to motion information on neighboring blocks held by the motion information buffering step; and performing, when it is determined that it is necessary to change the motion information, processing for recording the changed motion information in the motion information buffer and outputting the changed motion information to outside.

(3) A video coding program according to an exemplary aspect of the present invention is characterized by implementing the video coding method described in the above item (2) as a program executable by a computer.

Advantageous Effects of Invention

A video coding apparatus, a video coding method, and a video coding program according to the present invention provide the following advantageous effects.

In video coding processing, a large number of tasks can be processed in parallel, while suppressing deterioration in coding efficiency, thereby achieving high-speed processing.

Further, in the case of applying the technique according to the present invention to the existing video processing apparatus, the only effect on an encoder is that the options for arbitrarily selecting the neighboring blocks to be referred to are partially limited. In addition, there is no need to change a decoder, and thus the application range can be expanded.

DESCRIPTION OF EMBODIMENTS

Figure 1:
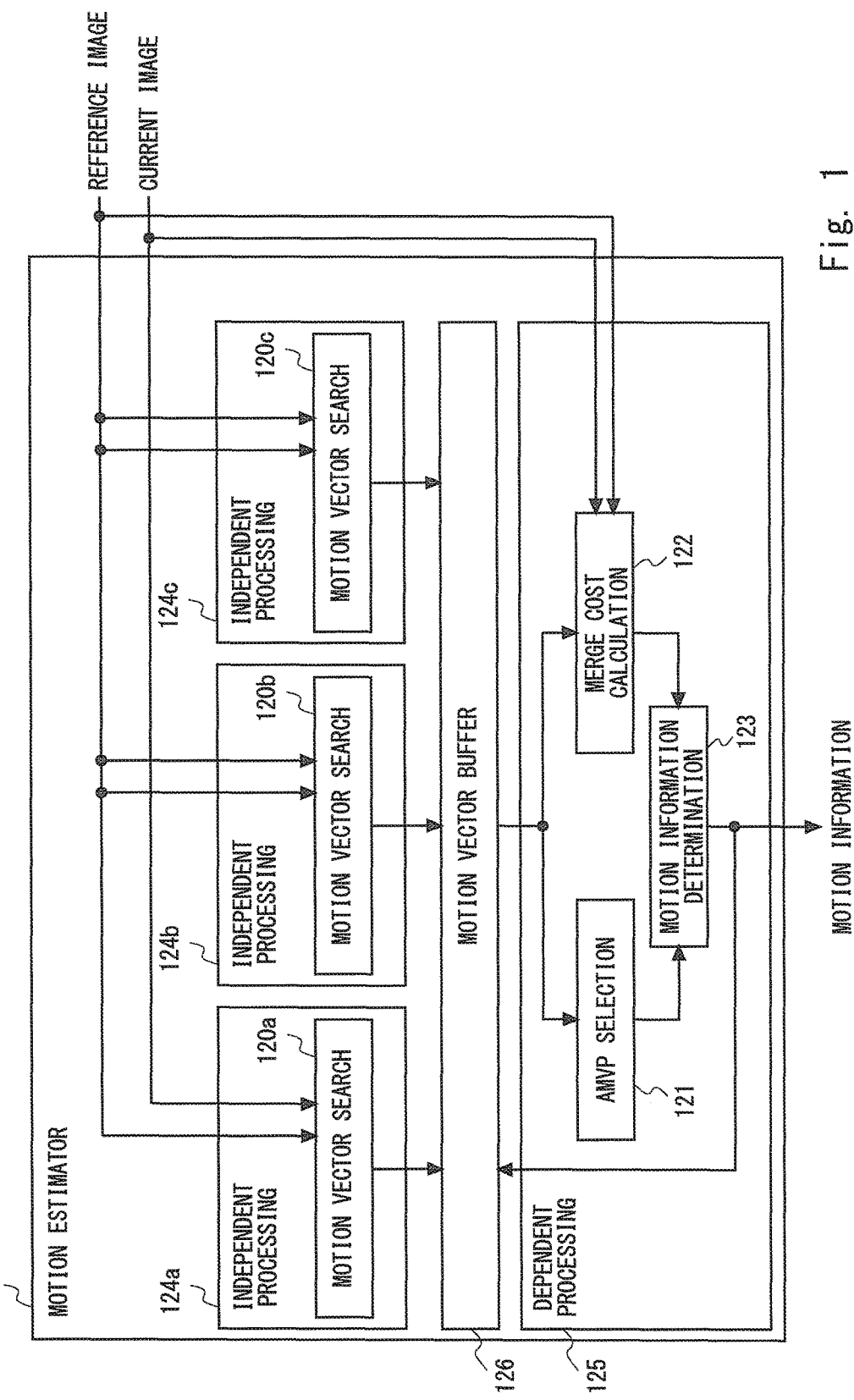
FIG. 1 is a block diagram showing a configuration example of a motion estimator of a video coding apparatus according to a first exemplary embodiment of the present invention.

Preferred embodiments of a video coding apparatus, a video coding method, and a video coding program according to the present invention will be described below with reference to the accompanying drawings. The video coding apparatus and the video coding method according to the present invention will be described below. However, the video coding method may be implemented as the video coding program which is executable by a computer, or may be recorded in a recording medium from which the video coding program can be read by the computer. In other words, the present invention is not limited to a hardware configuration. The processing of the present invention can also be implemented by causing a CPU (Central Processing Unit) to execute the video coding program.

The video coding program can be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer-readable media. Examples of transitory computer-readable media include electric signals, optical signals, and electromagnetic waves. Transitory computer-readable media can provide the program to a computer via a wired communication line, such as electric wires and optical fibers, or a wireless communication line.

Reference numerals in the drawings are used hereinafter to denote the components for convenience of illustration as an example to facilitate understanding, and thus it is not intended to limit the present invention to the modes illustrated in the drawings.

Features of the Present Invention

Prior to the description of exemplary embodiments of the present invention, the outline of features of the present invention will now be described. The main feature of the present invention is that, during video coding, the processing in which the result of processing on neighboring blocks is not essential, i.e., the processing, such as motion vector search, in which there is no dependence between blocks, is separated from the processing in which motion information on neighboring blocks is essential, i.e., the processing, such as merge cost calculation and AMVP selection, in which there is a dependence between blocks. Thus, the motion vector search, which requires an especially large amount of operation in the motion estimation, can be performed as parallel processing with high parallel performance.

First Exemplary Embodiment

In a first exemplary embodiment, as mentioned above, the processing in which the result of processing on neighboring blocks is not essential, i.e., independent processing including at least motion vector search processing in which there is no dependence between blocks, is separated from the processing in which motion information on neighboring blocks is essential, i.e., dependent processing including processing, such as merge cost calculation and AMVP selection, in which there is a dependence between blocks. Thus, the first exemplary embodiment is characterized in that the motion vector search, which requires an especially large amount of operation in the motion estimation, can be performed as parallel processing with high parallel performance.

Description of Configuration of First Exemplary Embodiment

Next, a configuration example of a video coding apparatus according to the first exemplary embodiment of the present invention will be described in detail with reference to the drawings. The video coding apparatus according to the first exemplary embodiment includes components similar to those of the video coding apparatus based on the H.265 specification shown in FIG. 19, except for the internal configuration of the motion estimator that calculates motion information between a coding target frame input as an input image and a coded reference frame. Specifically, the video coding apparatus according to the first exemplary embodiment includes a motion compensation predictor 001, an orthogonal transformer 002, a quantizer 003, an encoder (an entropy coder) 004, an inverse quantizer 005, an inverse orthogonal transformer 006, an intra frame predictor 007, a loop filter 009, and a frame buffer 010. The image coding apparatus further includes a motion estimator 108, instead of a motion estimator 008, as motion estimation processing means for dividing an input image into a plurality of blocks and estimating motion information including a motion vector for each of the divided blocks.

FIG. 1 shows a configuration example of the motion estimator 108 according to the first exemplary embodiment. The motion estimator 108, which can be replaced by the motion estimator 008 of the video coding apparatus shown in FIG. 19 as mentioned above, includes at least independent processing units 124a, 124b, and 124c, a dependent processing unit 125, and a motion vector buffer 126. FIG. 1 illustrates a case where three independent processing units, i.e., the independent processing units 124a, 124b, and 124c are provided. However, the number of independent processing units is not limited to three as long as two or more independent processing units are provided.

Each of the independent processing units 124a, 124b, and 124c is independent processing means for performing processing for each block without using motion information on other nearby blocks (neighboring blocks). The independent processing means is configured to be able to process all blocks in parallel every arbitrarily-set number of blocks. The configuration example including three independent processing means, i.e., the independent processing units 124a, 124b, and 124c shown in FIG. 1, illustrates a case where three blocks can be processed at once in parallel. The dependent processing unit 125 is dependent processing means for performing processing for each block using motion information on other nearby blocks (neighboring blocks). The motion vector buffer 126 is a motion information buffer, i.e., motion information holding means for holding motion information including a motion vector as a result of processing performed for each block.

The independent processing units 124a, 124b, and 124c include motion vector search units 120a, 120b, and 120c, respectively. Each of the motion vector search units 120a, 120b, and 120c is motion vector search means for searching for a motion vector of each block by, for example, block matching, using a reference image and a current image as an input. In the configuration example shown in FIG. 1, the three motion vector search means of the motion vector search units 120a, 120b, and 120c can perform motion vector search processing for three blocks in parallel, and output the processing results as provisional motion vectors of the respective blocks. The provisional motion vectors of the respective blocks output from the motion vector search units 120a, 120b, and 120c, respectively, are held in the motion vector buffer 126.

The dependent processing unit 125 determines whether or not to change the motion information on a coding processing target block by referring to the motion information on the neighboring blocks held in the motion vector buffer 126. When it is determined that it is necessary to change the motion information, the dependent processing unit 125 performs an operation to record the changed motion information in the motion vector buffer 126. The dependent processing unit 125 includes at least an AMVP selection unit 121, a merge cost calculation unit 122, and a motion information determination unit 123. The AMVP selection unit 121 is prediction vector selection means for selecting a prediction vector capable of minimizing a motion information code amount R in each block from among the motion vectors of the neighboring blocks held in the motion vector buffer 126, calculating a rate-distortion cost J1 associated with AMVP based on the selection result, and outputting the rate-distortion cost as an AMVP cost.

The merge cost calculation unit 122 is merge cost calculation means for calculating merge vector candidates from the motion vectors of the neighboring blocks held in the motion vector buffer 126, calculating a rate-distortion cost J2 of each merge vector candidate by using the reference image and the current image, selecting a merge vector candidate having a minimum rate-distortion cost J2 obtained by the calculation, and outputting the minimum rate-distortion cost J2 as a merge cost. The motion information determination unit 123 is motion information determination means for determining whether or not to set the coding processing target block to a merge mode based on a result of a comparison between the rate-distortion cost J2 (merge cost) of the merge vector candidate calculated by the merge cost calculation unit 122 and the rate-distortion cost J1 associated with AMVP (AMVP cost) obtained as a result of the calculation by the AMVP selection unit 121. When the merge cost is smaller than the AMVP cost, the motion information determination unit 123 determines to set the block to the merge mode, and updates the content of the motion vector buffer 126 with the merge mode.

Description of Operation of First Exemplary Embodiment

Figure 2:
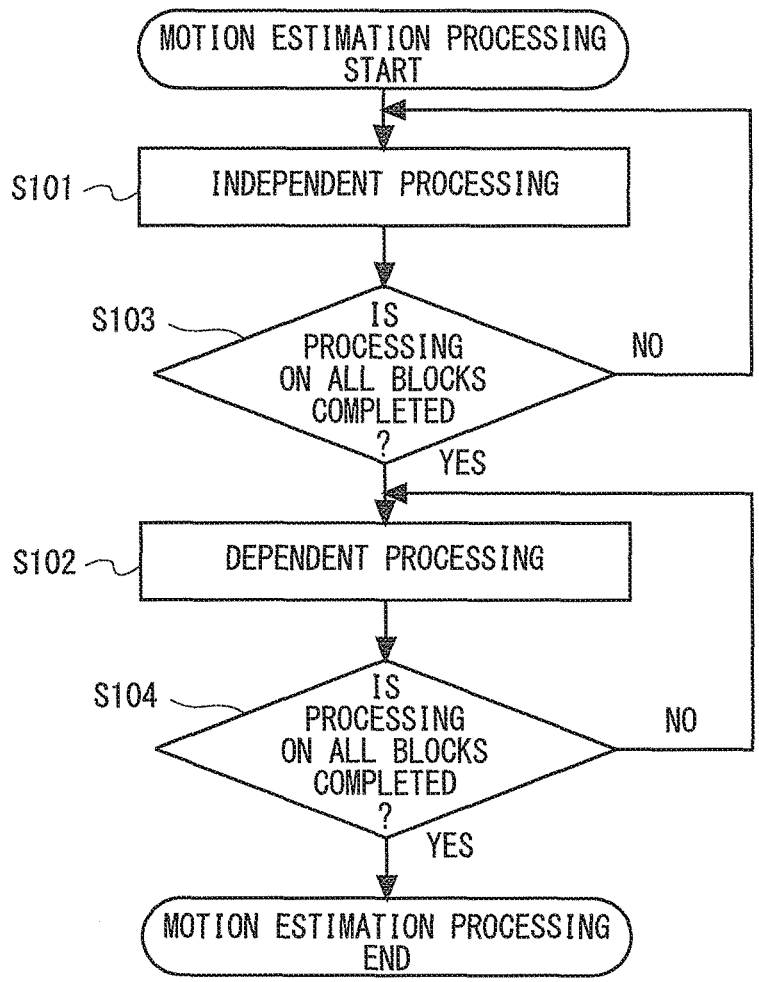
FIG. 2 is a flowchart showing an example of an outline of motion estimation processing in the motion estimator shown in FIG. 1.

Next, the operation of the motion estimator 108 illustrated in FIG. 1 as the first exemplary embodiment will be described in detail with reference to flowcharts shown in FIGS. 2 to 4. FIG. 2 is a flowchart showing an example of an outline of motion estimation processing in the motion estimator 108 shown in FIG. 1. As shown in the flowchart of FIG. 2, independent processing for each block is first performed in parallel (step S101, step S103), and then dependent processing is performed on all blocks using the processing result obtained in step S101 (step S102, step S104).

Next, the operations of steps S101 and S102 shown in FIG. 2 will be described in detail with reference to a flowchart shown in FIG. 3 and a flowchart shown in FIG. 4. FIG. 3 is a flowchart showing an example of the independent processing (step S101 shown in FIG. 2) in the independent processing units 124a, 124b, and 124c of the motion estimator 108 shown in FIG. 1. FIG. 4 is a flowchart showing an example of the dependent processing (step S102 shown in FIG. 2) in the dependent processing unit 125 of the motion estimator 108 shown in FIG. 1.

Figure 3:
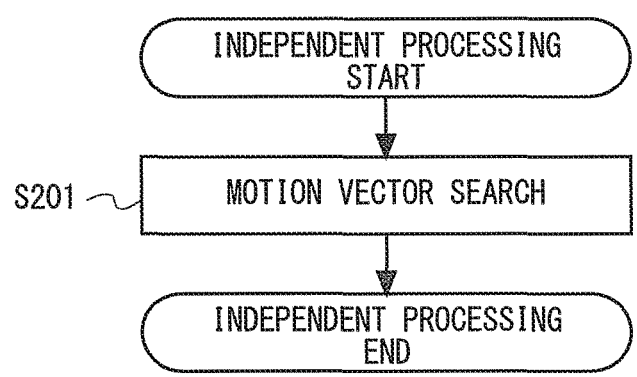
FIG. 3 is a flowchart showing an example of independent processing in an independent processing unit of the motion estimator shown in FIG. 1.

As for the independent processing in step S101 of FIG. 2, the motion vector search units 120a, 120b, and 120c perform motion vector search processing in the respective blocks in parallel as shown in the flowchart of FIG. 3 (step S201). The provisional motion vectors obtained as a result of the motion vector search processing are written into the motion vector buffer 126.

Next, the details of the dependent processing in step S102 of FIG. 2 will be described. As for the dependent processing, the processing for each block shown in the flowchart of FIG. 4 is executed as sequential processing. In each block, the AMVP selection unit 121 first lists AMVP candidates using the motion vectors of the neighboring blocks held in the motion vector buffer 126, and selects a prediction vector capable of minimizing the motion information code amount R (step S301). The rate-distortion cost J1 using the prediction vector with the minimum motion information code amount R is used as the AMVP cost. Next, the merge cost calculation unit 122 calculates the merge cost (step S302). In the calculation of the merge cost, merge vector candidates are listed from the motion vectors of the neighboring blocks held in the motion vector buffer 126, and the rate-distortion cost J2 of each of the listed merge vector candidates is calculated to thereby obtain the minimum rate-distortion cost J2 (merge cost).

Next, the motion information determination unit 123 compares the AMVP cost and the merge cost which are obtained in steps S301 and S302, respectively (step S303). When the merge cost is smaller than the AMVP cost (yes in step S303), the motion information determination unit 123 sets the merge mode as the motion information (step S304), and updates the content of the motion vector buffer 126 with the merge vector as the motion vector of the block (step S305). On the other hand, when the AMVP cost is smaller than the merge cost (no in step S303), the motion information determination unit 123 sets the prediction vector as the motion information (step S306). In other words, when the AMVP cost is smaller than the merge cost, the content of the motion vector buffer 126 is not updated.

The case where the dependent processing in the dependent processing unit 125 is sequentially carried out has been described above by way of example. However, the parallel processing can be performed by a plurality of dependent processing units like in the above-mentioned WPP, as long as the constraint of dependence on the neighboring blocks is satisfied.

Description of Advantageous Effects of First Exemplary Embodiment

Next, advantageous effects of the first exemplary embodiment will be described. In the first exemplary embodiment, the motion vector search operation, which requires a large amount of operation in the motion estimation processing, for all blocks in the plurality of motion vector search units 120a, 120b, and 120c, which are arranged in parallel, can be performed in parallel as independent processing. Accordingly, when a many-core processor is used, a larger number of processor cores can be effectively utilized, which leads to a reduction in processing time. Further, the AMVP selection and the merge selection can be performed using the result of the motion vector search and the result of the neighboring block merge determination, thereby suppressing deterioration in coding efficiency.

Second Exemplary Embodiment

In a second exemplary embodiment, coding target blocks are divided into two types. Further, when the dependent processing is performed on first blocks, updating of the motion vector is performed like in the first exemplary embodiment described above, while when the dependent processing is performed on second blocks, updating of the motion vector is not performed. Thus, the second exemplary embodiment is characterized in that the AMVP selection and merge cost calculation, which are dependent processing, can also be performed in parallel.

Specifically, in the second exemplary embodiment, after the independent processing for all blocks is completed, the dependent processing related to the blocks classified as the first blocks is performed using the result of the independent processing, and then the dependent processing related to the blocks classified as the second blocks is performed using the result of the independent processing and the result of the dependent processing on the first blocks.

Figure 5:
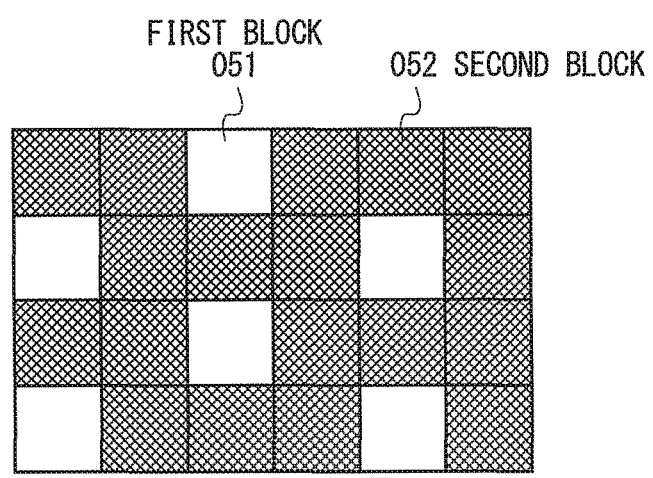
FIG. 5 is a schematic diagram for explaining an example in which coding target blocks are divided into first blocks and second blocks in a video coding apparatus according to a second exemplary embodiment of the present invention.

For example, as shown in FIG. 5, all blocks of the coding target image are divided into two groups, i.e., a group of first blocks 051 and a group of second blocks 052. The first blocks 051 are composed of the blocks, each of which is not located on the left side, the upper-left side, the upper side, and the upper-right side of the other first blocks, and the second blocks 052 are composed of the blocks other than the first blocks. FIG. 5 is a schematic diagram for explaining an example in which the coding target blocks are divided into the first blocks and the second blocks in the second exemplary embodiment. FIG. 5 shows an example in which eight blocks, which are neighboring blocks of a block included in the group of the first blocks 051 and surround the block (vertically, horizontally, and obliquely), are composed of blocks included in the group of the second blocks 052.

In the processing of AMVP selection and merge cost calculation, which are dependent processing related to the processing target blocks, the motion vectors of the left, upper left, upper, and upper right blocks in the neighboring blocks of the block are referenced. Accordingly, it can be understood that the first blocks 051 shown in FIG. 5 refer only to the motion vectors of the second blocks 052 in the neighboring blocks. Thus, updating of the motion vectors by the dependent processing for the first blocks 051 has no effect on the dependent processing for the other first blocks 051. Therefore, all the dependent processings for the first blocks 051 can be performed in parallel. Further, updating of the motion vectors is not performed in the dependent processing for the second blocks 052 shown in FIG. 5, so that the reference to the first blocks 051 and the second blocks 052 without distinction as neighboring blocks has no effect on the dependent processing for the other second blocks 052. Accordingly, all the dependent processings for the second blocks 052 can be executed in parallel.

Description of Configuration of Second Exemplary Embodiment

Next, the configuration of the video coding apparatus according to the second exemplary embodiment of the present invention will be described in detail. Like the video coding apparatus according to the first exemplary embodiment, the video coding apparatus according to the second exemplary embodiment includes components similar to those of the video coding apparatus based on the H.265 specification shown in FIG. 19, except for the internal configuration of the motion estimator. Specifically, the video coding apparatus according to the second exemplary embodiment includes the motion compensation predictor 001, the orthogonal transformer 002, the quantizer 003, the encoder (an entropy coder) 004, the inverse quantizer 005, the inverse orthogonal transformer 006, the intra frame predictor 007, the loop filter 009, and the frame buffer 010. The video coding apparatus according to the second exemplary embodiment further includes a motion estimator 208 instead of the motion estimator 008.

Figure 6:
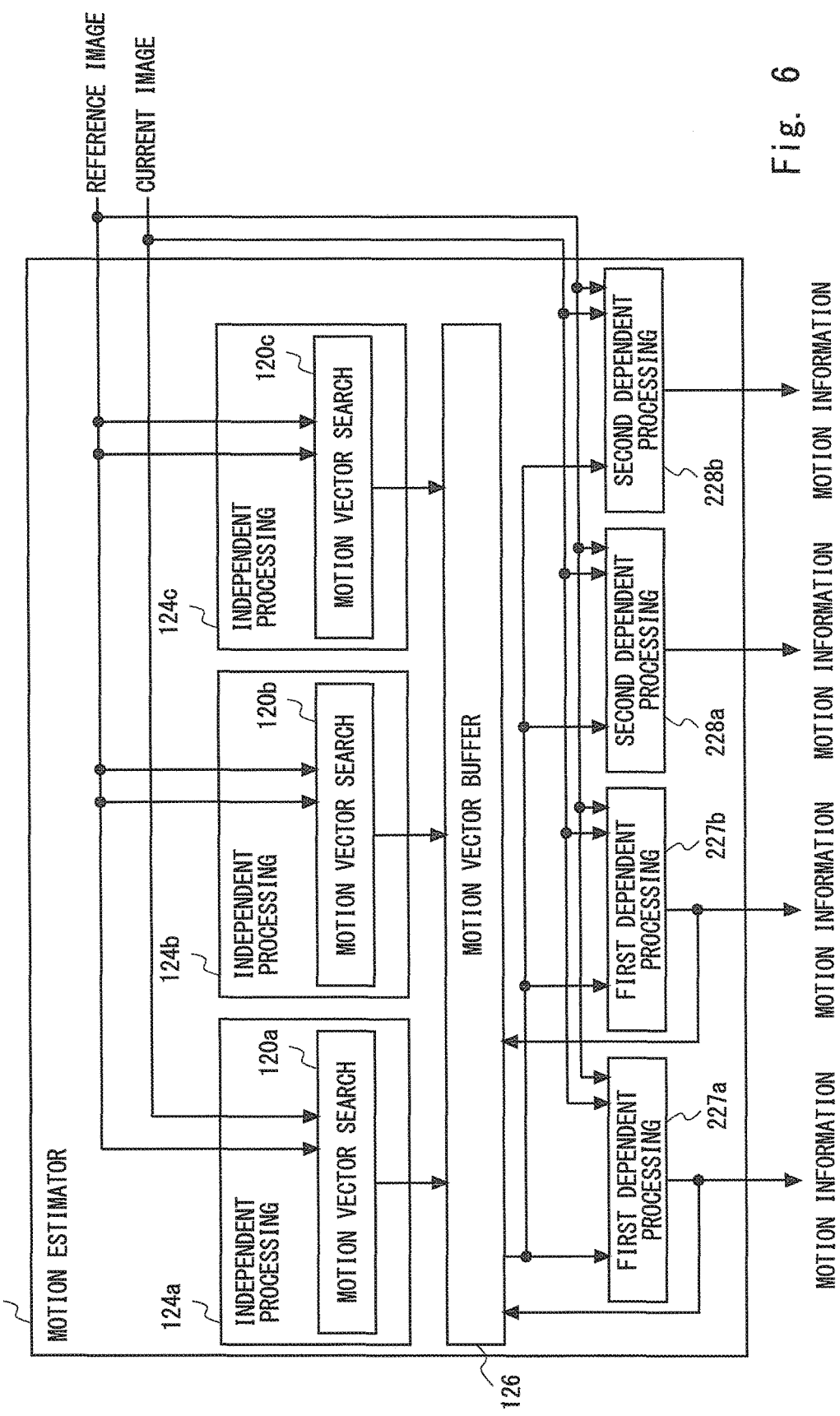
FIG. 6 is a block diagram showing a configuration example of a motion estimator in the video coding apparatus according to the second exemplary embodiment of the present invention.

FIG. 6 shows a configuration example of the motion estimator 208 according to the second exemplary embodiment. The motion estimator 208 includes at least the independent processing units 124a, 124b, and 124c, first dependent processing units 227a and 227b, second dependent processing units 228a and 228b, and the motion vector buffer 126. The independent processing units 124a, 124b, and 124c and the motion vector buffer 126 are similar to those of the motion estimator 108 illustrated in FIG. 1 as the first exemplary embodiment. The first dependent processing units 227a and 227b and the second dependent processing units 228a and 228b, which are components different from the dependent processing unit 125 of the motion estimator 108 shown in FIG. 1, will be described below.

Specifically, the motion estimator 208 shown in FIG. 6 has a configuration in which the first dependent processing units 227a and 227b that perform the dependent processing for the first blocks 051 and the second dependent processing units 228a and 228b that perform the dependent processing for the second blocks 052 are disposed instead of the dependent processing unit 125 of the motion estimator 108 shown in FIG. 1. FIG. 6 illustrates a case where the two first dependent processing units 227a and 227b and the two second dependent processing units 228a and 228b are provided. However, the number of dependent processing units is not limited to two, and any number of dependent processing units may be provided. The internal configuration of each of the first dependent processing units 227a and 227b and the second dependent processing units 228a and 228b includes at least the AMVP selection unit 121, the merge cost calculation unit 122, and the motion information determination unit 123, like in the case of the dependent processing unit 125 shown in FIG. 1.

The first dependent processing in the first dependent processing units 227a and 227b (first dependent processing means) and the second dependent processing in the second dependent processing units 228a and 228b (second dependent processing means) differ in whether the motion vectors obtained as a result of the independent processing in the independent processing units 124a, 124b, and 124c can be changed or not. In the first dependent processing in the first dependent processing units 227a and 227b, when the motion information on the processing target blocks is updated based on the result of referring to the motion information on neighboring blocks held in the motion vector buffer 126, recorded in the motion vector buffer 126, and output to the outside, the motion information on the processing target blocks including the motion vectors can be updated. Accordingly, in the first dependent processing, the motion vectors different from the result of the motion vector search in the independent processing units 124a, 124b, and 124c can be output as the motion information. In the second dependent processing in the second dependent processing units 228a and 228b, when the motion information on the processing target blocks is updated based on the result of referring to the motion information on neighboring blocks held in the motion vector buffer 126, recorded in the motion vector buffer 126, and output to the outside, the motion vectors in the motion information on the processing target blocks are not updated. Accordingly, in the second dependent processing, the motion vectors which are the same as those of the results of the motion vector search in the independent processing units 124*a*, 124*b*, and 124*c* are output as the motion information.

Description of Operation of Second Exemplary Embodiment

Figure 7:
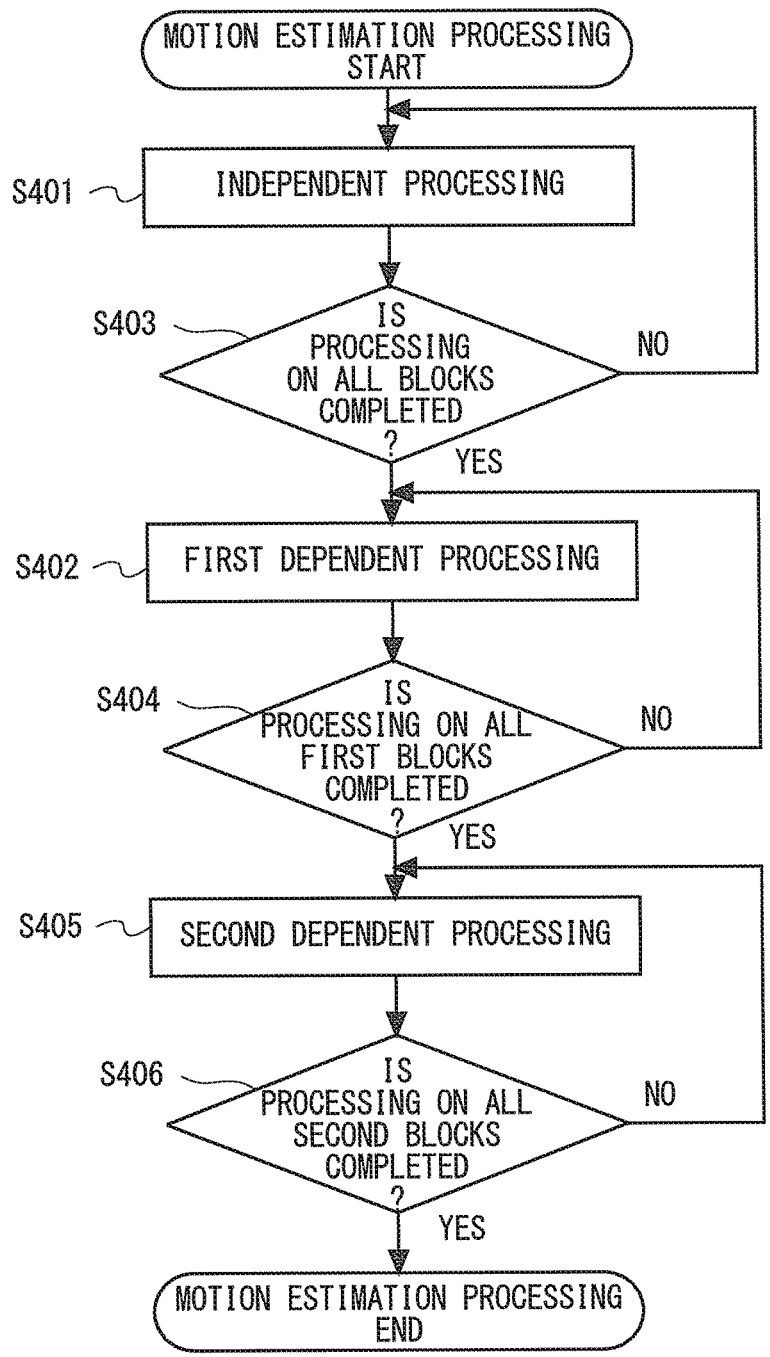
FIG. 7 is a flowchart showing an example of an outline of motion estimation processing in the motion estimator shown in FIG. 6.

Next, the operation of the motion estimator 208 illustrated in FIG. 6 as the second exemplary embodiment will be described in detail with reference to a flowchart shown in FIG. 7. FIG. 7 is a flowchart showing an example of an outline of motion estimation processing in the motion estimator 208 shown in FIG. 6. As shown in the flowchart of FIG. 7, the independent processing is first performed on all blocks in parallel (step S401, step S403) in the same manner as in steps S101 and S103 of the flowchart shown in FIG. 2. After that, the first dependent processing is performed on all the first blocks 051 by using the processing result obtained in step S401 (step S402, step S404).

Next, when all the first dependent processing related to the first blocks is completed (yes in step S404), the second dependent processing is performed on all the second blocks 052 (step S405, step S406). When all the second dependent processing related to the second blocks 052 is completed (yes in step S406), the motion estimation processing is completed. In this case, the first dependent processing in step S402 and the second dependent processing in step S405 can be performed on a plurality of blocks in parallel by using the plurality of first dependent processing units 227*a* and 227*b* and the plurality of second dependent processing units 228*a* and 228*b*, respectively.

Figure 4:
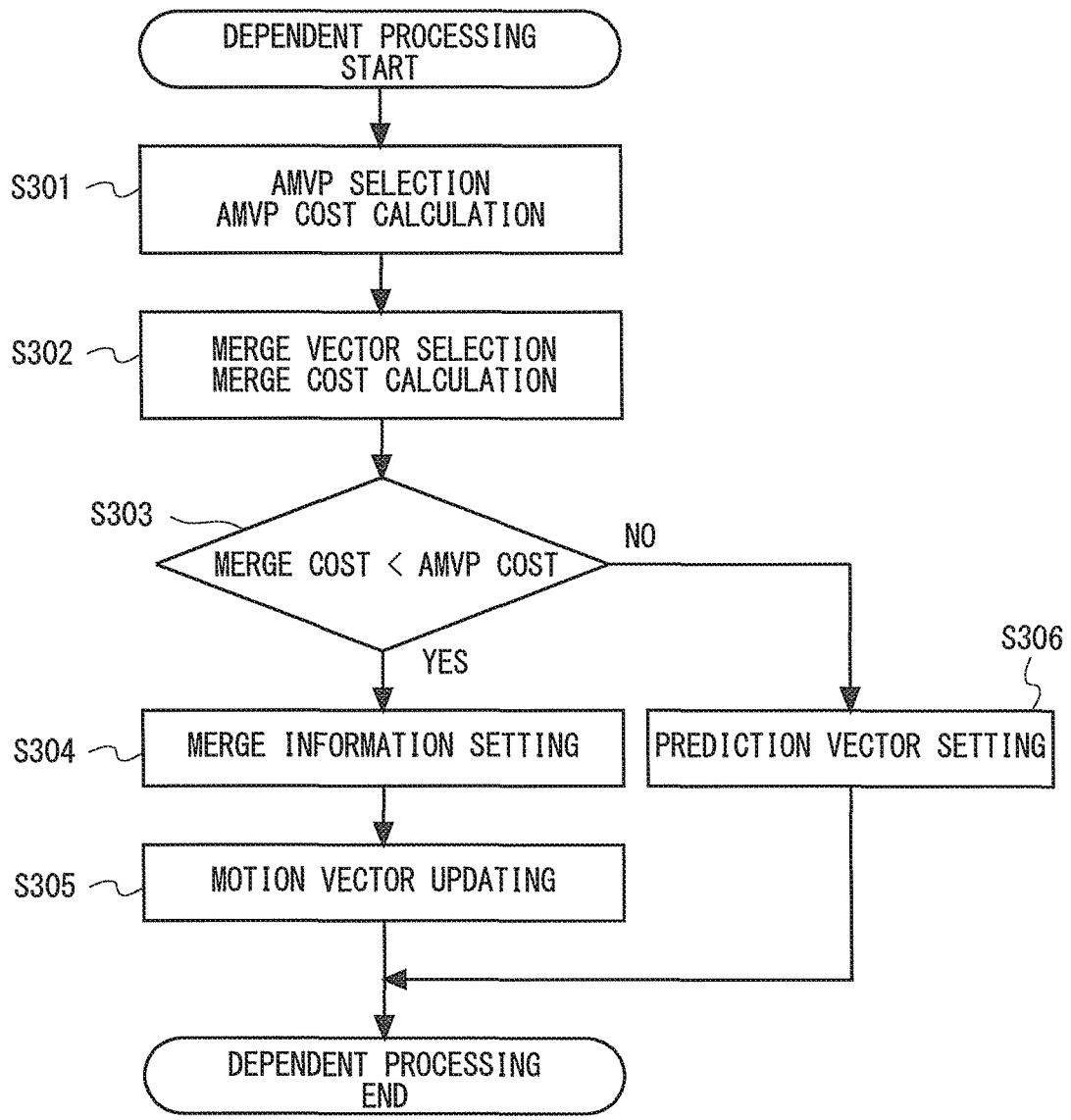
FIG. 4 is a flowchart showing an example of dependent processing in a dependent processing unit of the motion estimator shown in FIG. 1.

In the first dependent processing of the first dependent processing units 227*a* and 227*b*, the same operation as that shown in the flowchart of the dependent processing illustrated in FIG. 4 as the first exemplary embodiment is performed not on all blocks but only on the first blocks 051. However, since only the second blocks 052, in which the motion information is not changed, are referenced as the neighboring blocks in the processing for the first blocks 051 as illustrated in FIG. 5, the first dependent processing units 227*a* and 227*b* can operate in parallel.

Figure 8:
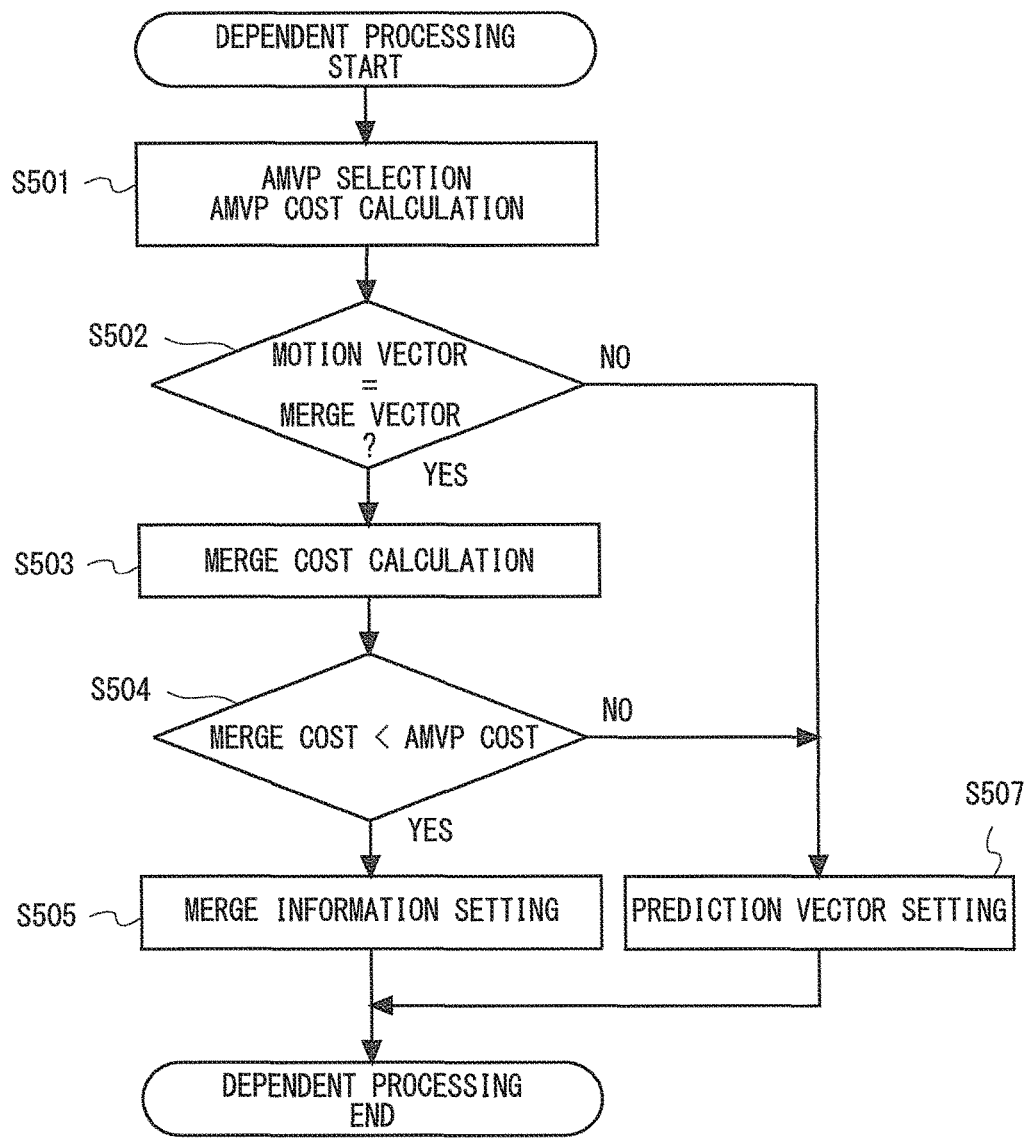
FIG. 8 is a flowchart showing an example of dependent processing in a second dependent processing unit of the motion estimator shown in FIG. 6.

Next, the operation of the second dependent processing of step S405 shown in FIG. 7 will be described in detail with reference to a flowchart shown in FIG. 8. FIG. 8 is a flowchart showing an example of the second dependent processing (step S405 shown in FIG. 7) in the second dependent processing units 228*a* and 228*b* of the motion estimator 208 shown in FIG. 6. Note that, as described above, in the second dependent processing in each of the second dependent processing units 228*a* and 228*b*, the dependent processing related to the second blocks 052 is performed.

For each of the second blocks, the AMVP selection unit 121 first lists AMVP candidates using the motion vectors of the neighboring blocks held in the motion vector buffer 126 and selects a prediction vector capable of minimizing the motion information code amount R (step S501) like in the case of step S301 illustrated in FIG. 4 as the first exemplary embodiment. The rate-distortion cost J1 using the prediction vector with the minimum motion information code amount R is used as the AMVP cost.

Next, the merge cost calculation unit 122 determines whether the provisional motion vector of the second block 052, which is held in the motion vector buffer 126, is the same as the merge vector in the merge mode (step S502). When the provisional motion vector of the second block 052 is the same as the merge vector (yes in step S502), the merge cost is calculated (step S503). In the calculation of the merge cost, like in the case of step S302 illustrated in FIG. 4 as the first exemplary embodiment, the merge vector candidates are listed from the motion vectors of the neighboring blocks held in the motion vector buffer 126, and the rate-distortion cost J2 of each of the listed merge vector candidates is calculated to thereby obtain the minimum rate-distortion cost J2 (merge cost).

Next, the motion information determination unit 123 compares the AMVP cost and the merge cost which are obtained in steps S501 and S503, respectively (step S504). When the merge cost is smaller than the AMVP cost (yes in step S504), the merge mode is set as the motion information, like in the case of step S304 illustrated in FIG. 4 as the first exemplary embodiment (step S505). However, unlike in the case of the first exemplary embodiment shown in FIG. 4, the result of the second dependent processing in the second blocks 052 is not referenced by other blocks. Accordingly, updating of the motion vector buffer 126 is not performed.

In step S502, when the provisional motion vector of the second block 052 is not the same as the merge vector (no in step S502), the merge cost is not calculated and the merge mode is not set in the motion information, like in the case where the AMVP cost is smaller than the merge cost in step S504 (no in step S504). Further, since the provisional motion vector is not changed, the motion vector in the motion vector buffer 126 is not updated. In other words, only the operation of setting the prediction vector as the motion information is performed, like in the case of step S306 illustrated in FIG. 4 as the first exemplary embodiment (step S507).

Description of Advantageous Effects of Second Exemplary Embodiment

In the second exemplary embodiment, the coding target blocks are divided into two types, i.e., the first blocks 051 and the second blocks 052, and the first blocks and the second blocks are processed in parallel by the plurality of first dependent processing units 227*a* and 227*b* and the plurality of second dependent processing units 228*a* and 228*b*, respectively. Thus, the dependent processing as well as the independent processing can be performed in parallel, which leads to a further reduction in processing time in comparison to the first exemplary embodiment.

Third Exemplary Embodiment

In the H.265 specification, as described above, the video coding apparatus (encoder) can arbitrarily select, from among the candidates, neighboring blocks used for merge mode determination and AMVP (prediction vector) selection. Accordingly, the number of first blocks in which motion vectors can be changed by the merge mode can be increased, while the parallel processing can be performed by partially limiting the blocks to be referenced in the first block group. Specifically, for example, first dependent processing means of the first dependent processing units 227*a* and 227*b* of the motion estimator 208 illustrated in FIG. 6 as the second exemplary embodiment are configured to arbitrarily select and reference only the blocks included in the group of the second blocks 052 as illustrated in FIG. 5 as neighboring blocks of the processing target block, and to perform processing on the blocks included in the group of the first blocks 051 in parallel. This configuration makes it possible to increase the number of blocks included in the first blocks 051.

Figure 9:
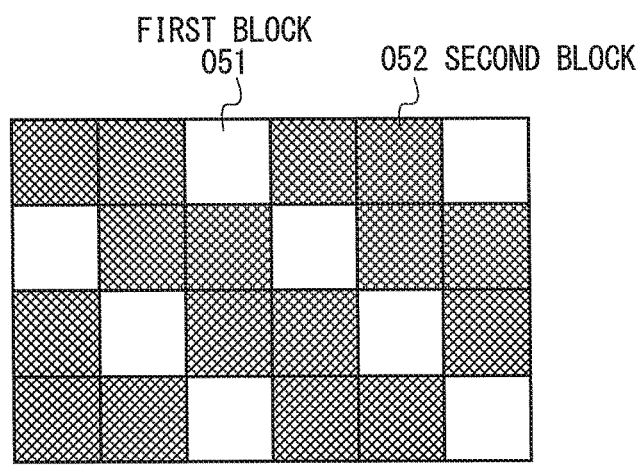
FIG. 9 is a schematic diagram for explaining an example in which coding target blocks are divided into first blocks and second blocks in a video coding apparatus according to a third exemplary embodiment of the present invention.

For example, in the merge mode determination and the AMVP selection, the first blocks 051 and the second blocks 052 can also be set as shown in FIG. 9 by prohibiting the reference to the upper left blocks of the respective first blocks 051 to limit the blocks to be referenced. FIG. 9 is a schematic diagram for explaining an example in which the coding target blocks are divided into the first blocks 051 and the second blocks 052 in the third exemplary embodiment. As shown in FIG. 9, only the second blocks 052, except the upper left blocks of the respective first blocks, are referred to by the first blocks 051. Accordingly, the number of the first blocks 051 can be increased in comparison to the case of the second exemplary embodiment shown in FIG. 5.

Figure 10:
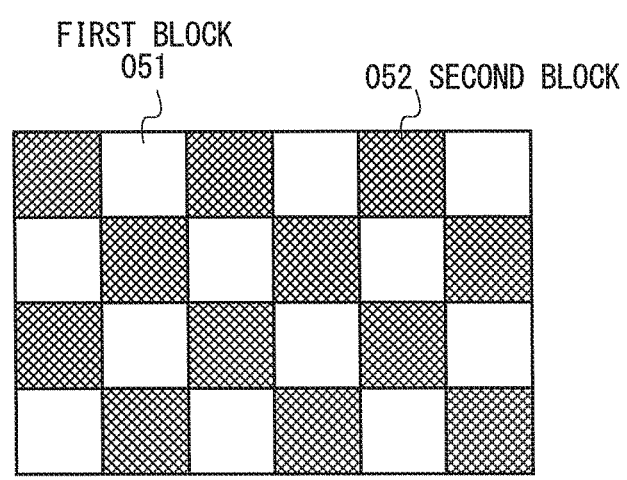
FIG. 10 is a schematic diagram for explaining another example in which coding target blocks are divided into first blocks and second blocks in the video coding apparatus according to the third exemplary embodiment of the present invention.
Figure 11:
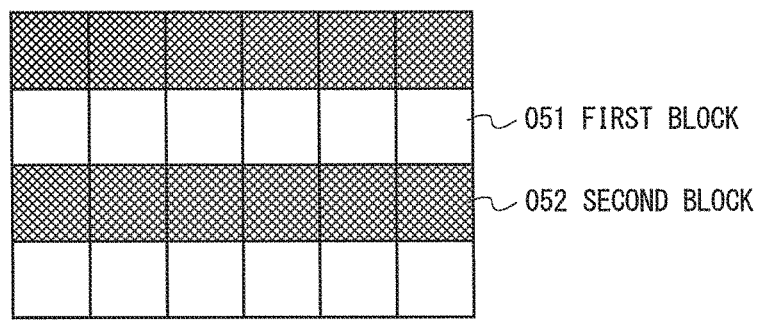
FIG. 11 is a schematic diagram for explaining an example which is different from the examples shown in FIGS. 9 and 10 and in which coding target blocks are divided into first blocks and second blocks in the video coding apparatus according to the third exemplary embodiment of the present invention.
Figure 12:
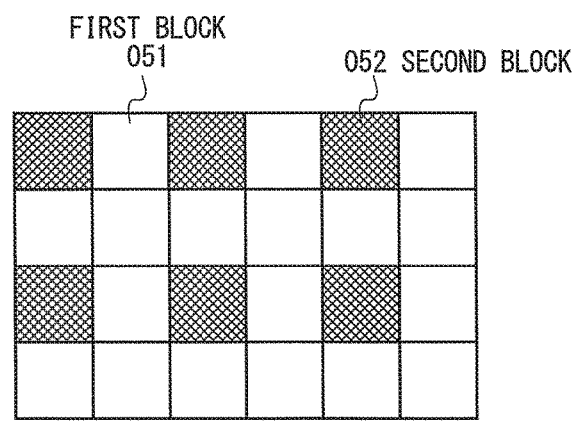
FIG. 12 is a schematic diagram for explaining still another example in which coding target blocks are divided into first blocks and second blocks in the video coding apparatus according to the third exemplary embodiment of the present invention.

The first blocks 051 and the second blocks 052 can also be set as shown in FIG. 10 by prohibiting the reference to the upper right blocks as well as the upper left blocks in the group of the first blocks 051. Alternatively, the first blocks 051 and the second blocks 052 can also be set as shown in FIG. 11 by prohibiting the reference to the left blocks in the group of the first blocks 051. Further, the first blocks 051 and the second blocks 052 can be set as shown in FIG. 12, and the blocks, the reference to which is to be prohibited, can be changed for each of the first blocks 051 as follows. For example, the reference to the upper left block, the upper block, and the upper right block of some of the first blocks 051 is prohibited; the reference to the left block, the upper left block, and the upper right block of some of the other first blocks 051 is prohibited; and the reference to the left block and the upper block of some of the other first blocks 051 is prohibited.

The configuration and operation of the video coding apparatus according to the third exemplary embodiment are similar to those of the second exemplary embodiment, and the motion estimator that performs motion estimation processing may have a configuration similar to that of the motion estimator 208 shown in FIG. 6. However, according to the third exemplary embodiment, in the processing of AMVP selection and merge cost calculation related to the second blocks 052, specific blocks preliminarily set as the blocks, the reference to which is prohibited, among the neighboring blocks, are not referred to, unlike in the case of the second exemplary embodiment. In this case, specific blocks indicate, for example, the upper left blocks of the respective first blocks 051 in the example in which the processing target blocks are divided into the first blocks 051 and the second blocks 052 as shown in FIG. 9.

Description of Advantageous Effects of Third Exemplary Embodiment

In the third exemplary embodiment, limitations are set on the neighboring blocks which can be referenced by the first blocks 051, thereby making it possible to increase the number of blocks (first blocks 051) in which motion vectors can be changed by merge mode determination, in comparison to the case of the second exemplary embodiment. Accordingly, the coding efficiency can be improved. Furthermore, the first blocks 051 as well as the second blocks 052 can be processed in parallel, and thus an increase in processing time can be suppressed.

Fourth Exemplary Embodiment

A fourth exemplary embodiment is characterized in that the first blocks 051 and the second blocks 052 can be processed in parallel by setting limitations not only on the first blocks 051 in the second and third exemplary embodiments, but also on the second blocks 052 which can be referenced. In other words, according to the fourth exemplary embodiment, in the second dependent processing for processing the second blocks 052, the reference to the first blocks 051 is prohibited and the reference only to the second blocks 052 in which motion vectors are not changed is allowed. For example, in the example of the block classification shown in FIG. 10, in the second dependent processing for processing the second blocks 052, the reference only to the second blocks 052, to be more specific, the reference only to the upper left blocks and upper right blocks in which motion vectors are not changed is allowed.

Description of Configuration of Fourth Exemplary Embodiment

Figure 19:
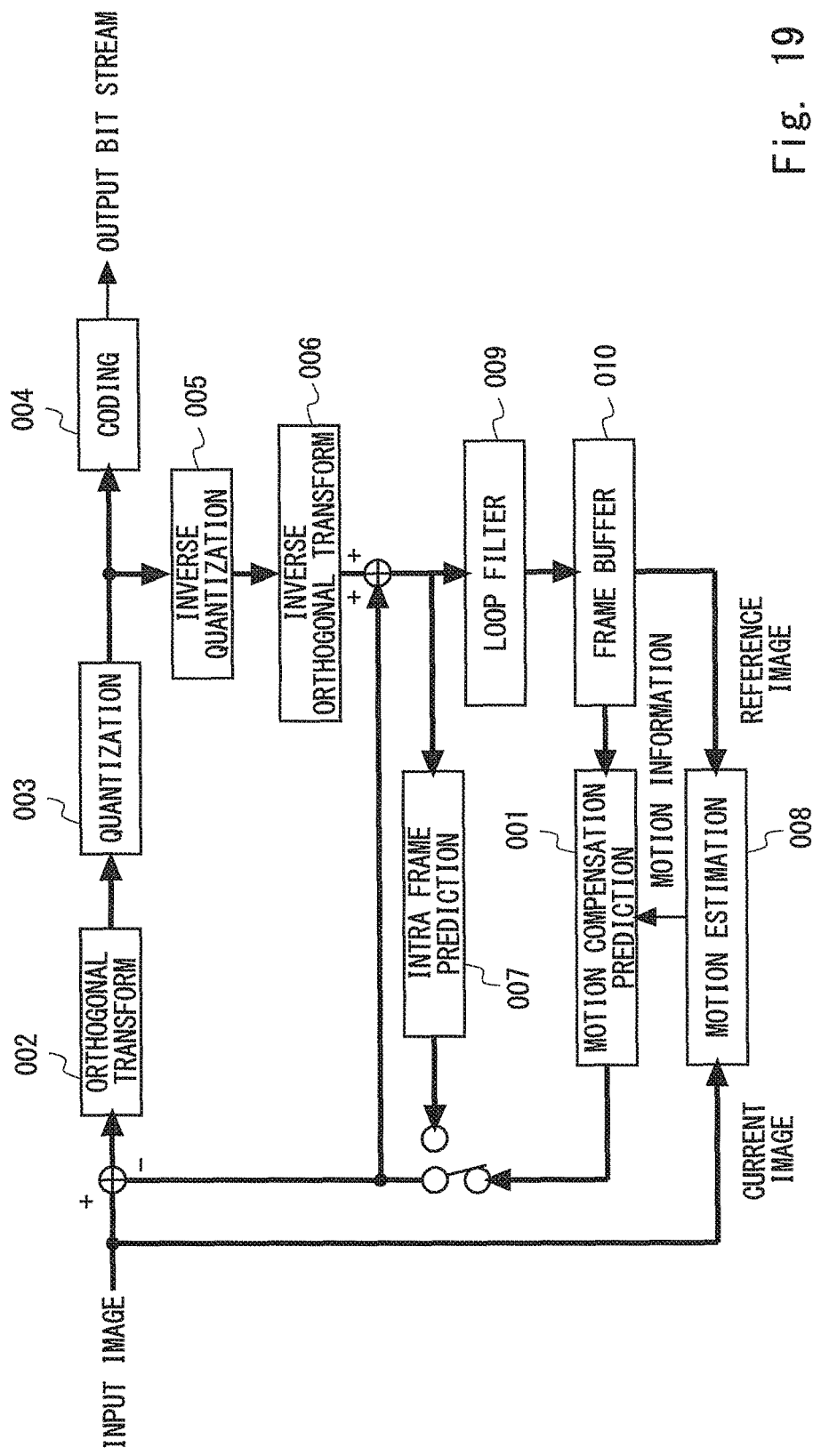
FIG. 19 is a block diagram showing an example of a video coding apparatus based on the H.265 specification.
Figure 20:
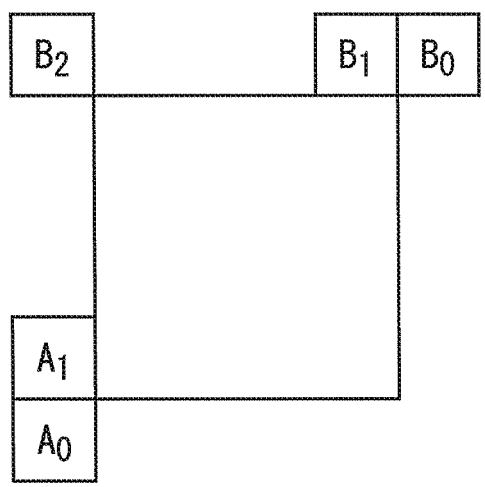
FIG. 20 is a schematic diagram for explaining spatially neighboring blocks of a coding target block.
Figure 21:
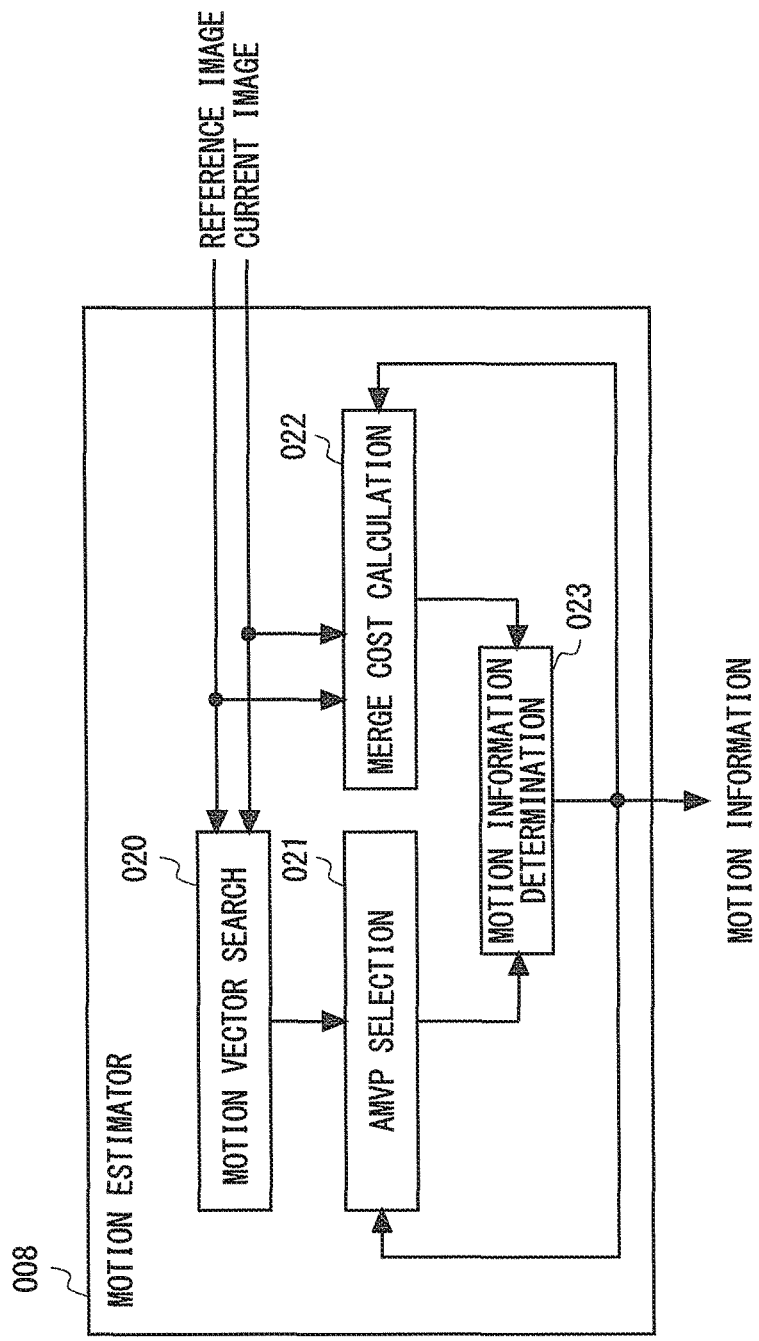
FIG. 21 is a block diagram showing a configuration example of a motion estimator of the video coding apparatus shown in FIG. 19.
Figure 22:
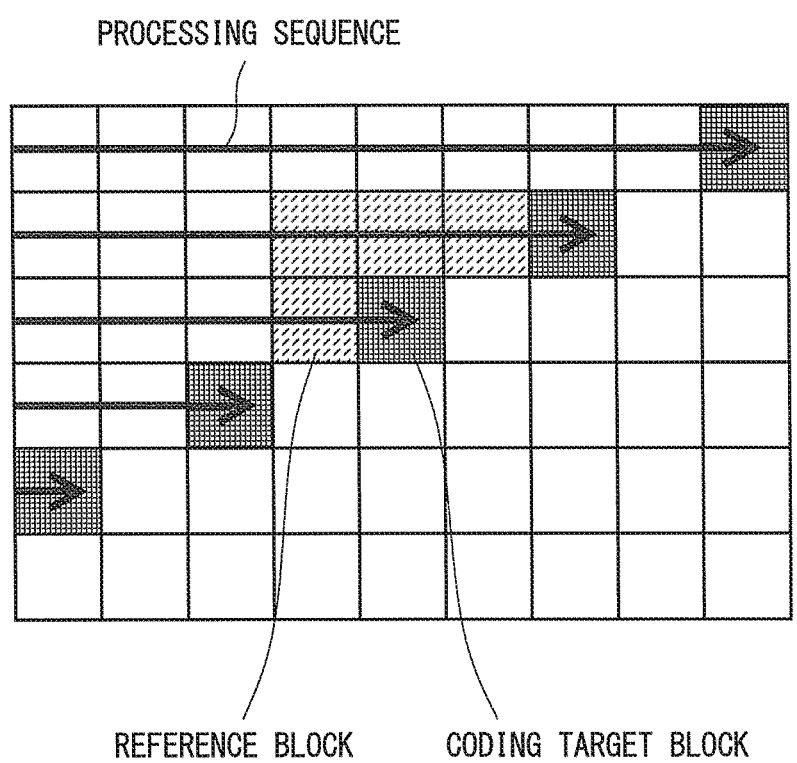
FIG. 22 is a schematic diagram for explaining a specific example of parallel processing by WPP disclosed in Non Patent Literature 2.

Like the video coding apparatus according to the first exemplary embodiment, the video coding apparatus according to the fourth exemplary embodiment includes components similar to those of the video coding apparatus based on the H.265 specification shown in FIG. 19, except for the internal configuration of the motion estimator. Specifically, the video coding apparatus according to the fourth exemplary embodiment includes the motion compensation predictor 001, the orthogonal transformer 002, the quantizer 003, the encoder (the entropy coder) 004, the inverse quantizer 005, the inverse orthogonal transformer 006, the intra frame predictor 007, the loop filter 009, and the frame buffer 010. The video coding apparatus according to the fourth exemplary embodiment further includes a motion estimator 308 instead of the motion estimator 008.

Figure 13:
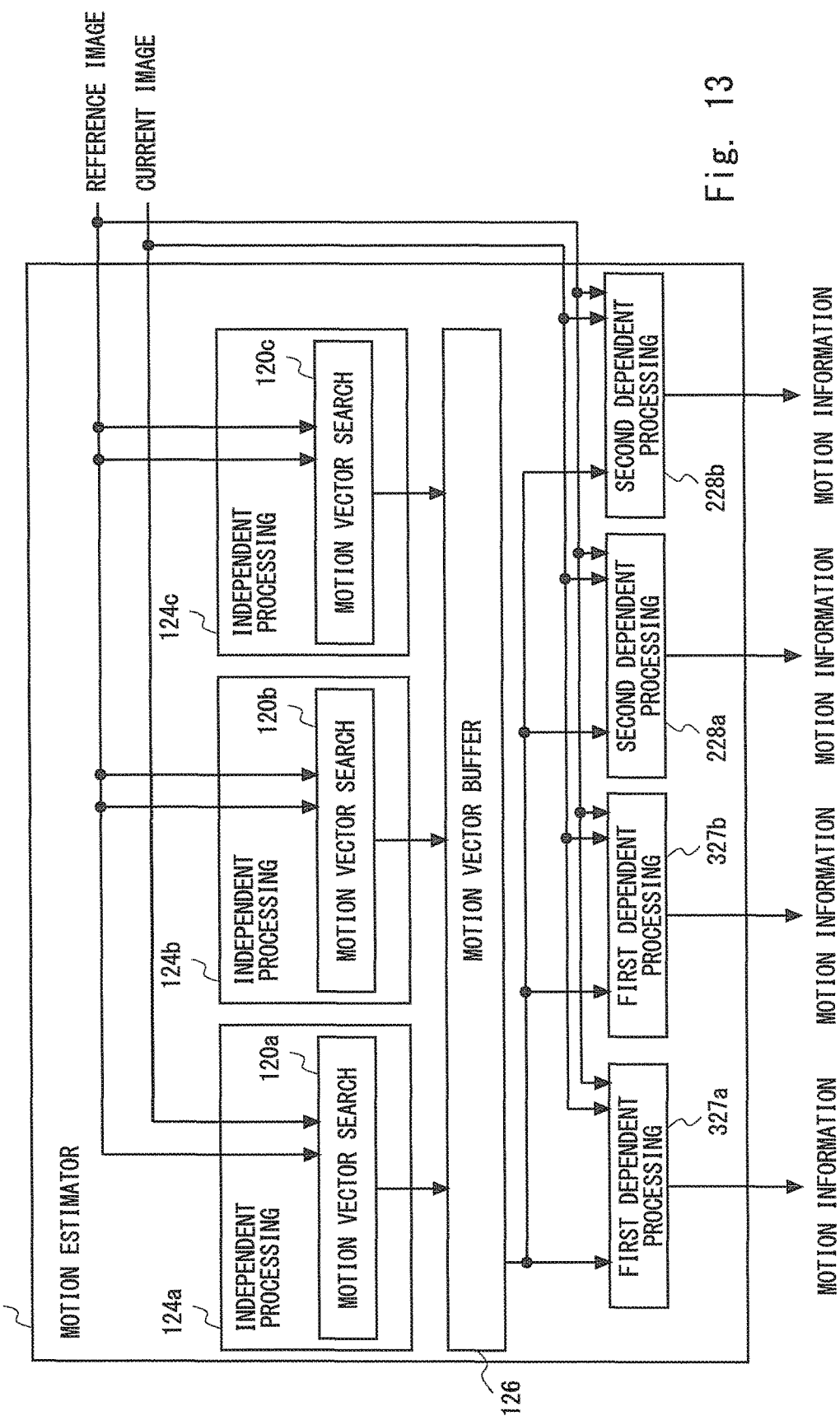
FIG. 13 is a block diagram showing a configuration example of a motion estimator in a video coding apparatus according to a fourth exemplary embodiment of the present invention.

FIG. 13 shows a configuration example of the motion estimator 308 according to the fourth exemplary embodiment. The motion estimator 308 includes the independent processing units 124a, 124b, and 124c, the second dependent processing units 228a and 228b, and the motion vector buffer 126, which have the same functions as those in the case of the motion estimator 208 illustrated in FIG. 6 as the second exemplary embodiment. The motion estimator 308 further includes at least first dependent processing units 327a and 327b which perform operations different from those of the first dependent processing units 227a and 227b in the case of the motion estimator 208 shown in FIG. 6. Like in the case of the first dependent processing units 227a and 227b shown in FIG. 6, when the processing target blocks are processed, the first dependent processing means of the first dependent processing units 327a and 327b perform the operation of processing the blocks included in the group of the first blocks 051 in parallel by referring only to the blocks included in the group of second blocks 052 among the neighboring blocks. Meanwhile, when the processing target blocks are processed, the second dependent processing means of the second dependent processing units 228a and 228b performs the operation of processing the blocks included in the group of the second blocks 052 in parallel by referring to the blocks included in the group of the second blocks 052 among the neighboring bocks, unlike in the case of the second dependent processing units 228a and 228b shown in FIG. 6. Thus, the first dependent processing means of the first dependent processing units 327a and 327b and the second dependent processing means of the second dependent processing units 228a and 228b can operate in parallel.

Description of Operation of Fourth Exemplary Embodiment

Figure 14:
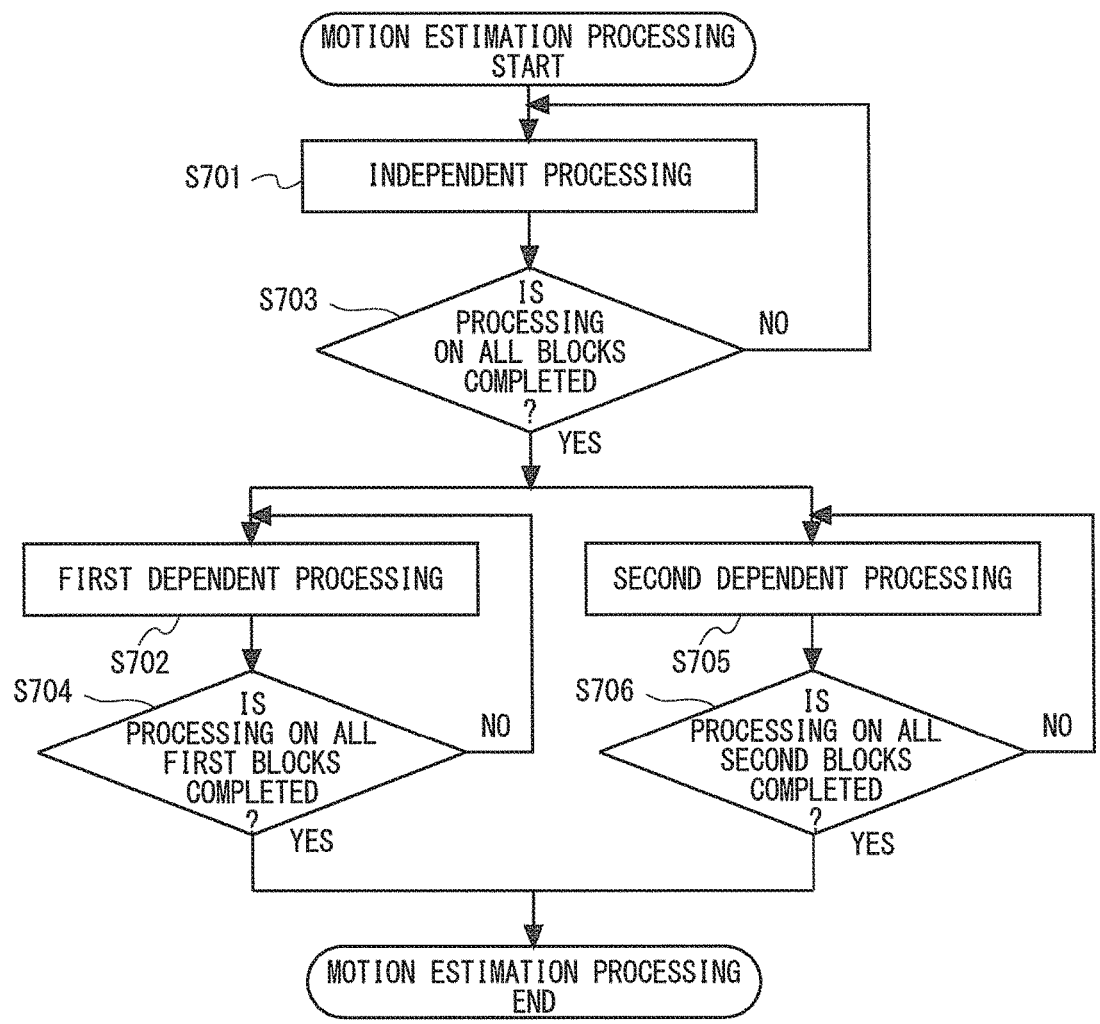
FIG. 14 is a flowchart showing an example of an outline of motion estimation processing in the motion estimator shown in FIG. 13.

Next, the operation of the motion estimator 308 illustrated in FIG. 13 as the fourth exemplary embodiment will be described in detail with reference to a flowchart shown in FIG. 14. FIG. 14 is a flowchart showing an example of the outline of motion estimation processing in the motion estimator 308 shown in FIG. 13. As shown in the flowchart of FIG. 14, the independent processing is first performed on all blocks in parallel (step S701, step S703) in the same manner as in steps S101 and S103 shown in the flowchart of FIG. 2. After that, the first dependent processing is performed on all the first blocks 051 by using the processing result obtained in step S101 (step S702, step S704), and in parallel to this processing, the second dependent processing similar to that in steps S401 and S406 of the flowchart shown in FIG. 7 is performed on all the second blocks 052 (step S705, step S706). However, in the second dependent processing in step S705, the blocks to be referenced as the neighboring blocks are limited only to the blocks included in the group of the second blocks 052, as described above.

That is, the operations in the independent processing and the second dependent processing are the same as the processing illustrated in FIG. 8 as the second exemplary embodiment, except that the blocks to be referenced in the second dependent processing are limited only to the second blocks 052. However, in the operation of the first dependent processing, the result of the first dependent processing related to the first blocks 051 is not referred to by other blocks. Accordingly, there is no need to update the motion vector buffer 126, unlike in the processing illustrated in FIG. 8 as the second exemplary embodiment.

Figure 15:
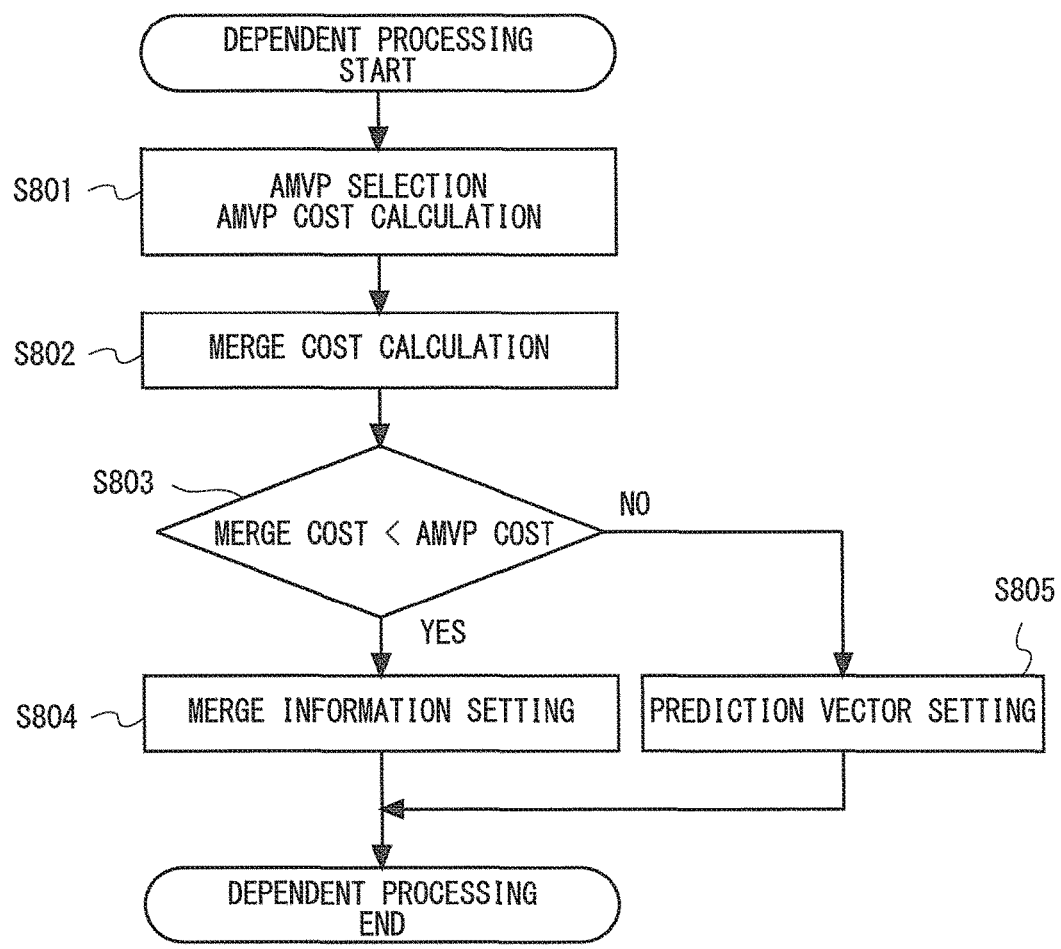
FIG. 15 is a flowchart showing an example of dependent processing in a first dependent processing unit of the motion estimator shown in FIG. 13.

Next, the operation of the first dependent processing in step S702 of FIG. 14 will be described in detail with reference to a flowchart shown in FIG. 15. FIG. 15 is a flowchart showing an example of the first dependent processing (step S702 shown in FIG. 14) in the first dependent processing units 327a and 327b of the motion estimator 308 shown in FIG. 13. In the first dependent processing in each of the first dependent processing units 327a and 327b, the dependent processing related to the first block 051 is performed as described above.

For each of the first blocks, the AMVP selection unit 121 first lists AMVP candidates using the motion vectors of the neighboring blocks held in the motion vector buffer 126 and selects a prediction vector capable of minimizing the motion information code amount R (step S801) like in the case of step S301 illustrated in FIG. 4 as the first exemplary embodiment. The rate-distortion cost J1 using the prediction vector with the minimum motion information code amount R is used as the AMVP cost.

Next, the merge cost calculation unit 122 calculates the merge cost (step S802). In the calculation of the merge cost, merge vector candidates are listed from the motion vectors of the neighboring blocks held in the motion vector buffer 126, and the rate-distortion cost of each of the listed merge vector candidates is calculated to thereby obtain the minimum rate-distortion cost J2 (merge cost).

Next, the motion information determination unit 123 compares the AMVP cost and the merge cost which are obtained in steps S801 and S802, respectively (step S803). When the merge cost is smaller than the AMVP cost (yes in step S803), the motion information determination unit 123 sets the merge mode as the motion information, like in the case of step S304 illustrated in FIG. 4 as the first exemplary embodiment (step S804). However, unlike in the first exemplary embodiment, the result of the first dependent processing on the first blocks 051 is not referred to by other blocks, and thus there is no need to update the motion vector buffer 126.

When the AMVP cost is smaller than the merge cost in step S803 (no in step S803), the motion information determination unit 123 sets the prediction vector as the motion information (step S805), like in the case of step S306 illustrated in FIG. 4 as the first exemplary embodiment.

As described above, in the fourth exemplary embodiment, the operation of the second dependent processing on the second blocks 052 is the same as the operation illustrated in the flowchart of FIG. 8 as the second exemplary embodiment, except that the blocks to be referenced as the neighboring blocks are limited. However, in the operation of the first dependent processing on the first blocks 051, the result of the first dependent processing on the first blocks 051 is not referred to by other blocks, unlike in the case illustrated in the flowchart of FIG. 8 as the second exemplary embodiment. Accordingly, as shown in the block diagram of FIG. 13 and the flowchart of FIG. 15, there is no need to update the content of the motion vector buffer 126 with the result of the first dependent processing. As shown in the flowchart of FIG. 14, in the fourth exemplary embodiment, the first dependent processing and the second dependent processing can be executed in parallel.

Description of Advantageous Effects of Fourth Exemplary Embodiment

In the fourth exemplary embodiment, the dependent processing for the first blocks and the dependent processing for the second blocks can be performed in parallel, which leads to a further reduction in processing time in comparison to the first, second, and third exemplary embodiments.

Fifth Exemplary Embodiment

A fifth exemplary embodiment is characterized in that, in addition to the cases of the second and third exemplary embodiments, not only the motion vectors of the first blocks, but also the motion vectors of the second blocks can be changed and the dependent processing for the first blocks is executed again by referring to the result of the dependent processing for the second blocks. A configuration example of a motion estimator according to the fifth exemplary embodiment may be the same as that of the motion estimator 208 illustrated in FIG. 6 as the second exemplary embodiment.

Description of Operation of Fifth Exemplary Embodiment

Figure 16:
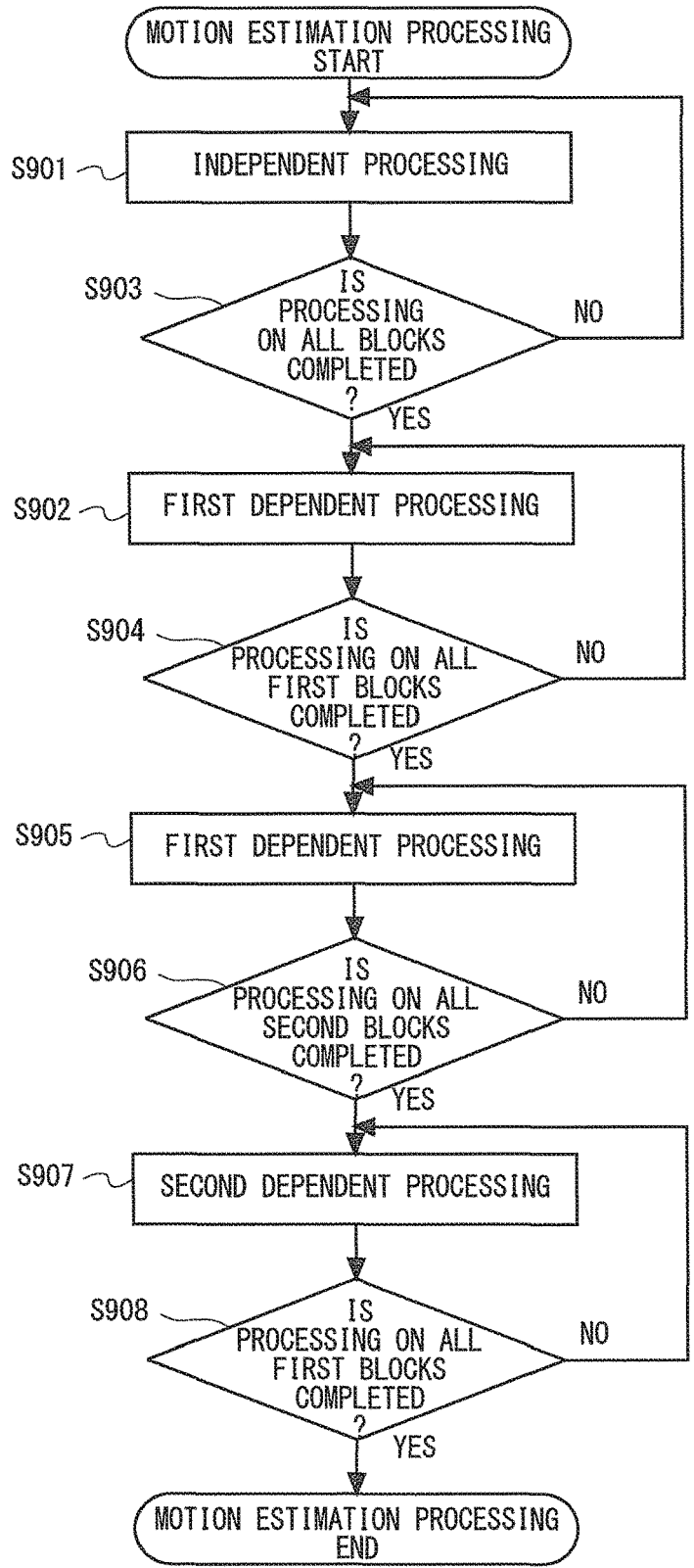
FIG. 16 is a flowchart showing an example of an outline of motion estimation processing in a motion estimator of a video coding apparatus according to a fifth exemplary embodiment of the present invention.

The flowchart of FIG. 16 shows an example of the outline of the operation of the motion estimator 208 according to the fifth exemplary embodiment. As shown in the flowchart of FIG. 16, the independent processing is first performed on all blocks in parallel (step S901, step S903) in the same manner as in steps S101 and S103 shown in the flowchart of FIG. 2. After that, the first dependent processing capable of changing motion vectors is performed on all the first blocks 051 in parallel (step S902, step S904). In this case, in step S902, the motion vectors of the first blocks 051 as well as the second blocks 052 can be referenced as the neighboring blocks. Instead of the result of step S902, the result of the independent processing in step S901 is used as the motion vector of each of the first blocks 051.

Next, when the first dependent processing related to the first blocks is completed (yes in step S904), instead of the second dependent processing in which motion vectors are not changed, the first dependent processing capable of changing motion vectors is performed on all the second blocks 052 in parallel (step S905, step S906). In this case, in step S905, only the motion vectors obtained as the result of the first dependent processing related to the first blocks 051 in step S902 are used for the neighboring blocks. After that, the processing for all the first blocks 051 is performed again, and the second dependent processing is performed on the first blocks 051 by referring to the processing result obtained in step S902 related to the first blocks 051 and the processing result obtained in step S905 related to the second blocks 051 (step S907, step S908). In other words, in step S907, the second dependent processing is performed, instead of the first dependent processing, on all the first blocks 051, and the motion vectors related to the first blocks 051 are not changed.

When all the second dependent processing related to the first blocks 052 is completed (yes in step S908), the motion estimation processing is completed. The flowchart of FIG. 16 illustrates a case where the first dependent processing related to the first blocks 051 and the second blocks 052 is performed once and then the second dependent processing related to the first blocks is performed. However, the processing may be repeated a number of times.

Description of Advantageous Effects of Fifth Exemplary Embodiment

In the fifth exemplary embodiment, the motion vectors can be changed at least once for the first blocks 051 as well as the second blocks 052, which leads to a further improvement in coding efficiency in comparison to the second and third exemplary embodiments.

Sixth Exemplary Embodiment

Figure 17:
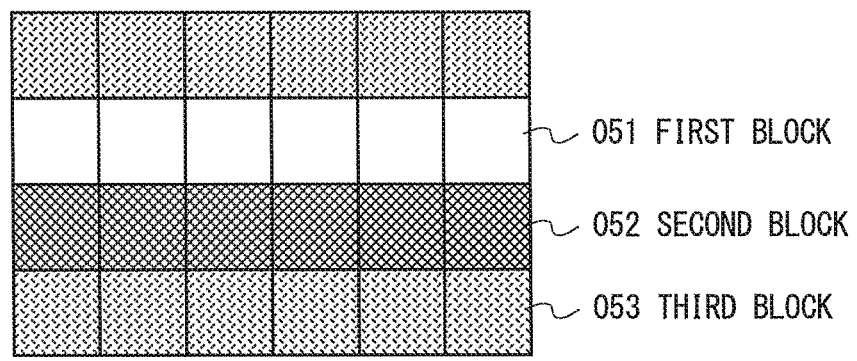
FIG. 17 is a schematic diagram for explaining an example in which coding target blocks are divided into various types of blocks in the video coding apparatus according to the sixth exemplary embodiment of the present invention.

A sixth exemplary embodiment is characterized in that the coding target blocks are divided into three or more types as shown in FIG. 17, instead of dividing the coding target blocks into two types like in the second to fifth exemplary embodiments. FIG. 17 is a schematic diagram for explaining an example in which the coding target blocks are divided into a plurality of types of blocks in the sixth exemplary embodiment. FIG. 17 illustrates a case where the coding target blocks are divided into three types, i.e., first blocks 051, second blocks 052, and third blocks 053. A configuration example of a motion estimator according to the sixth exemplary embodiment may be the same as that of the motion estimator 208 illustrated in FIG. 6 as the second exemplary embodiment. For example, in the case of using the motion estimator 208 shown in FIG. 6, the first dependent processing units 227a and 227b may perform the dependent processing related to the first blocks 051 and the second blocks 052 and the second dependent processing units 228a and 228b may perform the dependent processing related to the third blocks 053.

Description of Operation of Sixth Exemplary Embodiment

Figure 18:
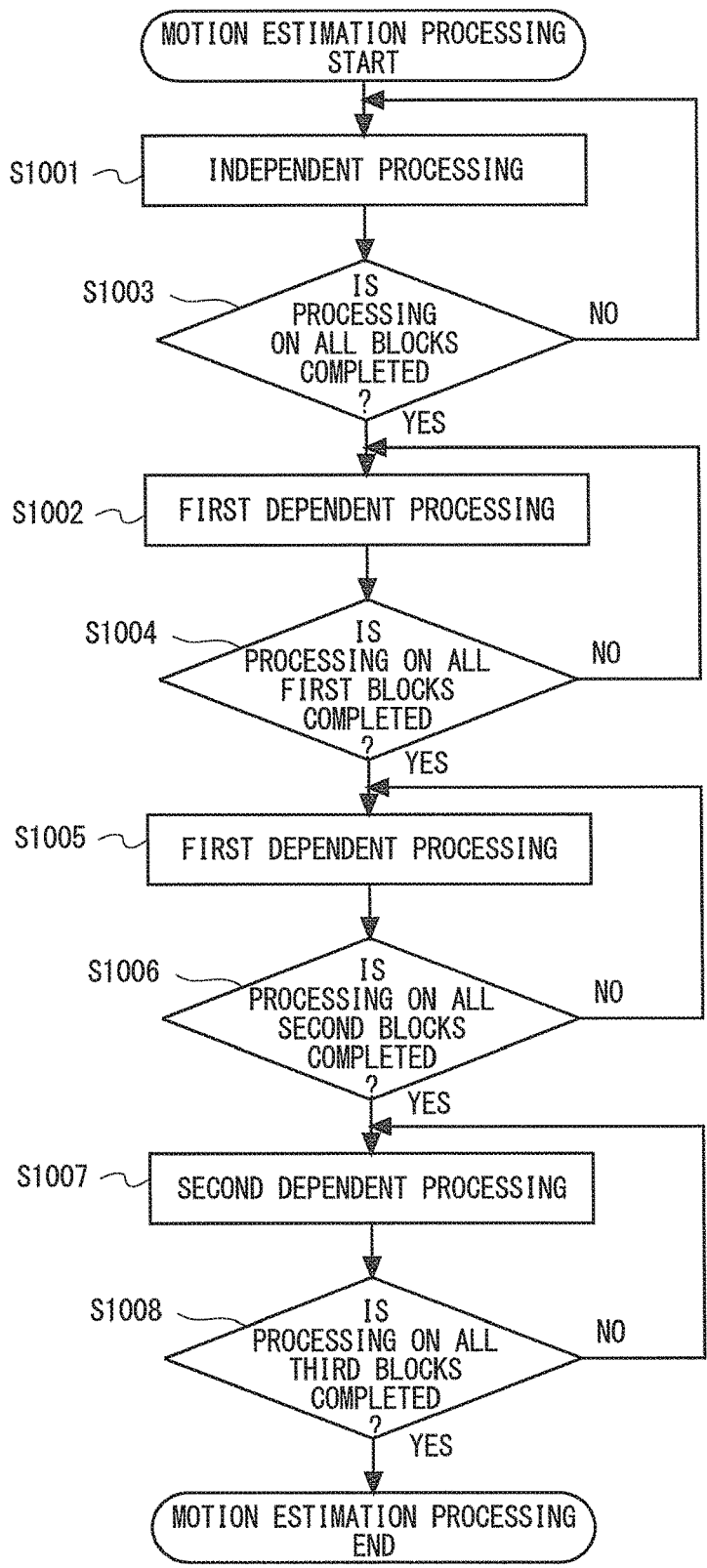
FIG. 18 is a flowchart showing an example of an outline of motion estimation processing in a motion estimator of the video coding apparatus according to the sixth exemplary embodiment of the present invention.

A flowchart shown in FIG. 18 illustrates an example of an outline of the operation of the motion estimator 208 in the sixth exemplary embodiment. As shown in the flowchart of FIG. 18, the independent processing is first performed on all blocks in parallel (step S1001, step S1003) in the same manner as in steps S101 and S103 shown in the flowchart of FIG. 2. After that, the first dependent processing capable of changing motion vectors is performed on all the first blocks 051 (step S1002, step S1004). In this case, in step S1002, the first dependent processing for the first blocks 051 is performed by referring to the third blocks 053.

Next, when all the first dependent processing related to the first blocks is completed (yes in step S1004), the first dependent processing capable of changing motion vectors is performed on all the second blocks 052 (step S1005, step S1006). In this case, in step S1005, the first dependent processing for the second blocks 052 is performed by referring to the first blocks 051 and the third blocks 053.

After that, the second dependent processing in which motion vectors are not changed is performed on all the third blocks 053 (step S1007, step S1008). In this case, in step 1007, the second dependent processing for the third blocks 053 is performed by referring to the first blocks 051, the second blocks 052, and the third blocks 053. The schematic diagram shown in FIG. 17 and the flowchart shown in FIG. 18 illustrate an example in which the processing target blocks are divided into three types, i.e., the first blocks 051, the second blocks 052, and the third blocks 053, but the number of type of blocks to be divided is not limited to three, as mentioned above. The same processing can be performed even when the number of types of blocks to be divided is increased.

Description of Advantageous Effects of Sixth Exemplary Embodiment

In the sixth exemplary embodiment, the number of blocks in which motion vectors can be changed can be increased in comparison to the second to fifth exemplary embodiments, which leads to a further improvement in coding efficiency in comparison to the second to fifth exemplary embodiments.

Other Exemplary Embodiments

In the AMVP selection processing described above, only the coding cost of the motion information is calculated and the vector for a neighboring block with a minimum difference from the motion vector is selected. However, if the rate-distortion cost is recalculated for candidate vectors in the vicinity of the prediction vector, an improvement in coding efficiency can be expected. Moreover, the coding efficiency can be further improved by repeating such processing, to be more specific, by performing processing of repeating the motion vector search using the vectors of neighboring blocks a plurality of times.

Only the motion vectors are illustrated as the data to be held in the motion vector buffer 126, but other information, such as coding mode information, may be additionally held. The use of various pieces of information as described above makes it possible to further increase the accuracy of the RD cost and further improve the coding efficiency.

Each of the above exemplary embodiments illustrates, as an example of the dependent processing, the AMVP selection processing and the merge mode determination processing in the codec based on the H.265 specification. For example, in the codec based on the H.264 specification, skip mode determination processing is further performed as the dependent processing.

INDUSTRIAL APPLICABILITY

According to the present invention, since it is possible to perform high-performance parallel processing, while maintaining a high coding efficiency, high-speed processing for high-resolution videos can be achieved. Therefore, the present invention can be usefully applied to imaging systems, transcoding systems, and the like which require high-resolution processing.

The configurations of the preferred exemplary embodiments of the present invention have been described above. However, it should be noted that the above exemplary embodiments are only illustrative of the present invention and it is not intended that the present invention be limited to the exemplary embodiments. It is easily understood by those skilled in the art that the present invention can be modified in various ways depending on particular applications without departing from the scope of the present invention.

This application is based upon and claims the benefit of priority from Japanese patent application No. 2013-250926, filed on Dec. 4, 2013, the disclosure of which is incorporated herein in its entirety by reference.

REFERENCE SIGNS LIST

001 MOTION COMPENSATION PREDICTOR
002 ORTHOGONAL TRANSFORMER
003 QUANTIZER
004 ENCODER (ENTROPY CODER)
005 INVERSE QUANTIZER
006 INVERSE ORTHOGONAL TRANSFORMER
007 INTRA FRAME PREDICTOR
008 MOTION ESTIMATOR
009 LOOP FILTER
010 FRAME BUFFER
020 MOTION VECTOR SEARCH UNIT
021 AMVP SELECTION UNIT
022 MERGE COST CALCULATION UNIT
023 MOTION INFORMATION DETERMINATION UNIT
051 FIRST BLOCK
052 SECOND BLOCK
053 THIRD BLOCK
108 MOTION ESTIMATOR
120a MOTION VECTOR SEARCH UNIT
120b MOTION VECTOR SEARCH UNIT
120c MOTION VECTOR SEARCH UNIT
121 AMVP SELECTION UNIT
122 MERGE COST CALCULATION UNIT
123 MOTION INFORMATION DETERMINATION UNIT
124a INDEPENDENT PROCESSING UNIT
124b INDEPENDENT PROCESSING UNIT
124c INDEPENDENT PROCESSING UNIT
125 DEPENDENT PROCESSING UNIT
126 MOTION VECTOR BUFFER
208 MOTION ESTIMATOR
227a FIRST DEPENDENT PROCESSING UNIT
227b FIRST DEPENDENT PROCESSING UNIT
228a SECOND DEPENDENT PROCESSING UNIT
228b SECOND DEPENDENT PROCESSING UNIT
308 MOTION ESTIMATOR
327a FIRST DEPENDENT PROCESSING UNIT
327b FIRST DEPENDENT PROCESSING UNIT

What is claimed is:

1. A video coding apparatus comprising:
motion estimation processing unit for dividing an image into a plurality of blocks and estimating motion information including a motion vector for each of the divided blocks, wherein
the motion estimation processing unit comprises:
independent processing unit for performing processing for each block without using motion information on neighboring blocks;
dependent processing unit for performing processing for each block using motion information on neighboring blocks; and
a motion information buffer configured to holds motion information as a result of processing performed for each block,
the independent processing unit comprises motion vector search unit configured to be able to process all blocks in parallel every arbitrarily-set number of blocks, searches for a motion vector of each block using a reference image and a current image as an input, and records the motion vector in the motion information buffer, and
the dependent processing unit determines whether or not to change motion information on a processing target block by referring to motion information on neighboring blocks held in the motion information buffer, and when it is determined that it is necessary to change the motion information, the dependent processing unit performs an operation to record the changed motion information in the motion information buffer and output the changed motion information to outside,
wherein the dependent processing unit comprises:
first dependent processing unit capable of updating the motion information on the processing target block including the motion vector when the motion information on the processing target block is updated based on a result of referring to the motion information on the neighboring blocks held in the motion information buffer, recorded in the motion information buffer, and output to the outside; and
second dependent processing unit for not updating the motion vector included in the motion information on the processing target block when the motion information on the processing target block is updated based on the result of referring to the motion information on the neighboring blocks held in the motion information buffer, recorded in the motion information buffer, and output to the outside.

2. The video coding apparatus according to claim 1, wherein
all blocks of an image to be processed by the motion estimation processing unit are divided into a first block group and a second block group,
when the processing target block is processed, the first dependent processing unit performs an operation to process blocks included in the first block group in parallel by referring only to blocks included in the second block group among the neighboring blocks, and
when the processing target block is processed, the second dependent processing unit performs an operation to process blocks included in the second block group in parallel by referring to blocks included in the first block group and blocks included in the second block group among the neighboring blocks.

3. The video coding apparatus according to claim 2, wherein when eight blocks surrounding a block included in the first block group as neighboring blocks of the block are divided into groups in such a manner that all the eight blocks are blocks included in the second block group, the first dependent processing unit selects and refers to only the blocks included in the second block group surrounding the block as neighboring blocks of the processing target block, or the first dependent processing unit arbitrarily selects and refers to only the blocks included in the second block group as neighboring blocks of the processing target block, regardless of whether the eight blocks surrounding the block included in the first block group as neighboring blocks of the block are divided into groups in such a manner that all the eight blocks are blocks included in the second block group.

4. The video coding apparatus according to claim 1, wherein the first dependent processing unit and the second dependent processing unit operate in parallel by processing including:
dividing all blocks of an image to be processed by the motion estimation processing unit into a first block group and a second block group;
performing, by the first dependent processing unit, an operation to process blocks included in the first block group in parallel by referring to blocks included in the second block group among the neighboring blocks, when the processing target block is processed, and
performing, by the second dependent processing unit, an operation to process blocks included in the second block group in parallel by referring to blocks included in the second block group among the neighboring blocks, when the processing target block is processed.

5. The video coding apparatus according to claim 1, wherein all blocks of an image to be processed by the motion estimation processing unit are divided into a first block group and a second block group, when the processing target block is processed, the first dependent processing unit performs an operation to process blocks included in the first block group in parallel by referring to blocks included in the first block group and blocks included in the second block group among the neighboring blocks, and then performs an operation to process blocks included in the second block group in parallel by referring to blocks included in the first block group among the neighboring blocks, and after that, when the processing target block is processed, the second dependent processing unit performs an operation to process blocks included in the first block group in parallel by referring to blocks included in the first block group and blocks included in the second block group among the neighboring blocks.

6. The video coding apparatus according to claim 1, wherein the dependent processing unit comprises:
prediction vector selection processing unit for selecting a prediction vector capable of minimizing a code amount of motion information in each block from among motion vectors of neighboring blocks held in the motion vector buffer, calculating a rate-distortion cost based on a result of the selection, and outputting the rate-distortion cost as an AMVP (Adaptive Motion Vector Prediction) cost;
merge cost calculation unit for calculating a rate-distortion cost of each merge vector candidate obtained from the motion vectors of the neighboring block held in the motion vector buffer, and outputting a minimum rate-distortion cost as a merge cost; and
motion information determination unit for determining whether or not to set the processing target block to a merge mode based on a result of a comparison between the merge cost and the AMVP cost.

7. A video coding method comprising dividing an image into a plurality of blocks and estimating motion information including a motion vector for each of the divided blocks,
wherein the estimation of the motion information includes:
performing processing for each block without using motion information on neighboring blocks;
performing processing for each block using motion information on neighboring blocks; and
holding motion information as a result of processing performed for each block,
wherein the processing for each block without using the motion information on neighboring blocks is configured to be able to process all blocks in parallel every arbitrarily-set number of blocks, and includes: searching for a motion vector of each block using a reference image and a current image as an input; and holding the motion vector by holding the motion information, and
wherein the processing for each block using the motion information on neighboring blocks includes: determining whether or not to change motion information on a processing target block by referring to motion information on neighboring blocks held by holding the motion information as the result of processing for each block; and performing, when it is determined that it is necessary to change the motion information, processing for recording the changed motion information in the motion information buffer and outputting the changed motion information to outside,
wherein
the processing for each block using the motion information on neighboring blocks includes:
allowing an update of the motion information on the processing target block including the motion vector when the motion information on the processing target block is updated based on a result of referring to the motion information on the neighboring blocks held in the motion information buffer, recorded in the motion information buffer, and output to the outside; and
not updating the motion vector included in the motion information on the processing target block when the motion information on the processing target block is updated based on the result of referring to the motion information on the neighboring blocks held in a motion information buffer, recorded in the motion information buffer, and output to the outside.

8. A non-transitory computer readable medium storing a video coding program for causing a computer to execute the video coding method according to claim 7.

* * * * *